(12) United States Patent
Li et al.

(10) Patent No.: US 9,513,503 B2
(45) Date of Patent: Dec. 6, 2016

(54) DISPLAY APPARATUS AND POLARIZER FOR MULTI-DOMAIN VERTICAL ALIGNED LIQUID CRYSTAL DISPLAY APPARATUS

(75) Inventors: Wang-Yang Li, Tainan (TW); Ting-Yi Wu, Kaohsiung (TW)

(73) Assignee: CHI MEI MATERIALS TECHNOLOGY CORPORATION, Tainan (TW)

( * ) Notice: Subject to any disclaimer, the term of this patent is extended or adjusted under 35 U.S.C. 154(b) by 185 days.

(21) Appl. No.: 13/571,997

(22) Filed: Aug. 10, 2012

(65) Prior Publication Data

US 2013/0038804 A1 Feb. 14, 2013

(30) Foreign Application Priority Data

Aug. 11, 2011 (TW) .............................. 100128742 A
Sep. 1, 2011 (TW) .............................. 100131574 A

(51) Int. Cl.
| | | |
|---|---|---|
| G02F 1/1335 | (2006.01) | |
| G02B 5/18 | (2006.01) | |
| G02B 27/28 | (2006.01) | |
| G02F 1/139 | (2006.01) | |
| G02F 1/1337 | (2006.01) | |

(52) U.S. Cl.
CPC ....... *G02F 1/133504* (2013.01); *G02B 5/1814* (2013.01); *G02B 5/1819* (2013.01); *G02B 27/281* (2013.01); *G02F 1/1393* (2013.01); *G02F 2001/133562* (2013.01);
(Continued)

(58) Field of Classification Search
CPC ................. G02F 2201/305; G02F 1/133504; G02B 5/1819
See application file for complete search history.

(56) References Cited

U.S. PATENT DOCUMENTS 6,067,137 A * 5/2000 Ohnishi ............ G02F 1/133504
349/112
7,675,591 B2 * 3/2010 Kim et al. .................... 349/106
(Continued)

FOREIGN PATENT DOCUMENTS

| EP | 0 567 995 | 11/1993 |
|---|---|---|
| JP | 2000258772 | 9/2000 |

(Continued)

OTHER PUBLICATIONS

English language translation of abstract of JP 2005-070632 (published Mar. 17, 2005).

(Continued)

*Primary Examiner* — Jessica M Merlin
*Assistant Examiner* — Mark Teets
(74) *Attorney, Agent, or Firm* — McClure, Qualey & Rodack, LLP

(57) ABSTRACT

A display apparatus and a polarizer for multi-domain vertical aligned liquid crystal display apparatus are provided. The display apparatus includes a liquid crystal display device, a first polarizer, a second polarizer and a diffractive optical element. The first polarizer is disposed on the first substrate. The second polarizer is disposed between the second substrate and the backlight module. The diffractive optical element includes a first diffraction grating and is disposed on a light emitting side of the first polarizer. An azimuth angle the first diffraction grating is counted from an absorbing axis of the first polarizer as standard.

25 Claims, 36 Drawing Sheets

(52) U.S. Cl.
CPC ............ *G02F 2001/133742* (2013.01); *G02F 2001/133761* (2013.01); *G02F 2201/305* (2013.01)

(56) References Cited

U.S. PATENT DOCUMENTS

| | | | | |
|---|---|---|---|---|
| 8,638,281 B2* | 1/2014 | Yeom | ................... | G02B 5/0231 345/87 |
| 8,736,787 B2 | 5/2014 | Li et al. | | |
| 8,817,208 B2* | 8/2014 | Li | ..................... | G02F 1/133504 349/112 |
| 9,036,117 B2* | 5/2015 | Li | ..................... | G02F 1/133504 349/112 |
| 2008/0158486 A1 | 7/2008 | Kim et al. | | |
| 2010/0134733 A1* | 6/2010 | Watanabe | ............ | G02B 5/0215 349/112 |
| 2010/0171906 A1* | 7/2010 | Sakai | .............................. | 349/96 |
| 2011/0187964 A1 | 8/2011 | Li et al. | | |
| 2011/0279752 A1* | 11/2011 | Yamahara | ................. | G02B 5/02 349/64 |
| 2012/0013654 A1* | 1/2012 | Yashiro | ............. | G02F 1/133504 345/690 |
| 2012/0033153 A1* | 2/2012 | Wu | ................... | G02F 1/133504 349/61 |
| 2014/0347609 A1* | 11/2014 | Li | ..................... | G02F 1/133504 349/99 |

FOREIGN PATENT DOCUMENTS

| | | | | |
|---|---|---|---|---|
| JP | 2005-070632 | | 3/2005 | |
| JP | WO 2010116559 A1 | * | 10/2010 | ....... G02F 1/133504 |
| TW | 201128262 A1 | | 8/2011 | |

OTHER PUBLICATIONS

SIPO Office Action dated Nov. 27, 2015 in corresponding Chinese application (No. 201210285419.7).

JP Office Action mailed Dec. 8, 2015 in corresponding Japanese application (No. 2012-177986).

* cited by examiner

DISPLAY APPARATUS AND POLARIZER FOR MULTI-DOMAIN VERTICAL ALIGNED LIQUID CRYSTAL DISPLAY APPARATUS

This application claims the benefits of Taiwan application Serial No. 100128742, filed Aug. 11, 2011, and 100131574, filed Sep. 1, 2011, the subject matters of which are incorporated herein by reference.

BACKGROUND

Technical Field

The disclosure relates in general to a display apparatus and more particularly to a display apparatus having a diffractive optical element.

Description of the Related Art

Currently, an image display device mainly comprises a liquid crystal display device, a plasma display device, an OLED display device and an electronic paper display device, etc. The liquid crystal display device is a non-self-luminous display device, and thus usually needs a backlight source for generating light that entering the liquid crystal display panel with a uniform plane profile through an optical film such as a diffusion film, a brightness enhancement film, etc, for displaying an image.

A conventional wide viewing angle liquid crystal display device such as a vertical aligned or multi-domain vertical aligned liquid crystal display device has a wide viewing angle. However, an image displayed by it at some specific observation angles needs to be improved. For example, there is an obvious difference of the image color and brightness at different observation angles of the left, right side and the front view. In addition, the difference of the image color and brightness would increase as the viewing angle increases. At some special viewing angles of the upper left side, the lower left side, the upper right side, the lower left side, and the image deviation problem is more serious. In addition, the contrast-decreasing problem also occurs due to light leakage.

Therefore, a display apparatus for improving image quality problems such as difference of image color, brightness, etc is need.

SUMMARY

A display apparatus is provided. The display apparatus comprises a liquid crystal display device, a first polarizer, a second polarizer and a diffractive optical element. The liquid crystal display device comprises a backlight module and a liquid crystal panel. The liquid crystal panel comprises a first substrate, a second substrate and a liquid crystal layer. The liquid crystal layer is disposed between the first substrate and the second substrate. The liquid crystal layer comprises liquid crystal molecules. As no electrical field is applied in the liquid crystal layer, liquid crystal molecules are substantially perpendicular to surfaces of the first substrate and the second substrate, or the molecules have a pretilt angle substantially equal to or bigger than 60 degrees with the surfaces of the first substrate and the second substrate. As an electrical field is applied in the liquid crystal layer, the liquid crystal molecules are tilted into a liquid crystal tilt direction by the electrical field. The first polarizer is disposed on the first substrate. The second polarizer is disposed between the second substrate and the backlight module. A polarizing direction of the first polarizer is substantially perpendicular to a polarizing direction of the second polarizer. The diffractive optical element comprises a first diffraction grating and is disposed on a light emitting side of the first polarizer. An azimuth angle the first diffraction grating is counted from an absorbing axis of the first polarizer as standard.

A polarizer for a multi-domain vertical aligned liquid crystal display apparatus is provided. The polarizer comprises a first polarizer and a diffractive optical element. The first polarizer has a light absorbing axis. The diffractive optical element comprises a first diffraction grating and is disposed on a side of the first polarizer. An included angle between a grating direction of the first diffraction grating and the light absorbing axis is in a range between 0±15 degrees or in a range between 90±10 degrees.

The above and other aspects of the disclosure will become better understood with regard to the following detailed description of the non-limiting embodiment(s). The following description is made with reference to the accompanying drawings.

BRIEF DESCRIPTION OF THE DRAWINGS

FIGS. 33A-1 and 33B-1 illustrate three dimensional diagrams of the substrate and the liquid crystal layer of the display devices in embodiments, wherein no electrical field is applied in the liquid crystal layer.

FIGS. 33A-2 and 33B-2 illustrates top views of the substrate and the liquid crystal layer of the display device in embodiments, wherein no electrical field is applied in the liquid crystal layer.

FIG. 34B-1 illustrates a three dimensional diagram of the substrate and the liquid crystal layer of the display device, wherein an electrical field is applied in the liquid crystal layer.

FIG. 34B-2 illustrates a top view of the substrate and the liquid crystal layer of the display device, wherein an electrical field is applied in the liquid crystal layer.

DETAILED DESCRIPTION

Figure 1:
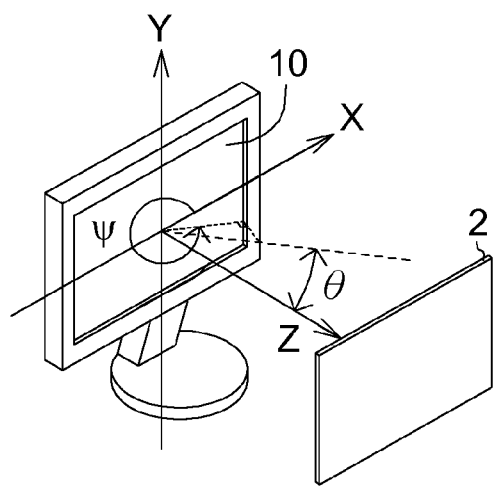
FIG. 1 illustrates a three dimensional diagram of a display apparatus according to one embodiment of the present invention.
Figure 2:
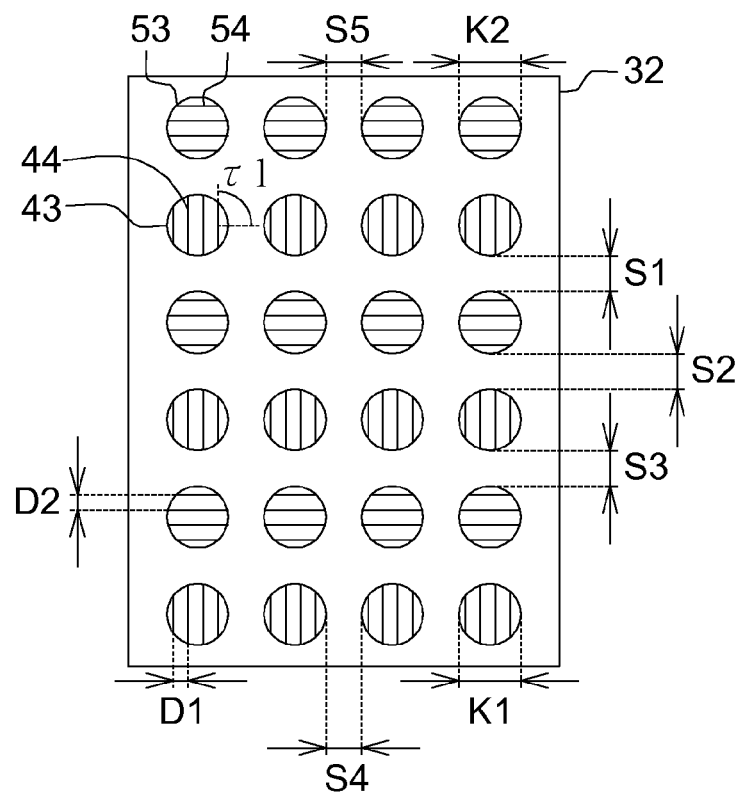
FIGS. 2-8 and 17-31 illustrate diffractive optical elements in embodiments.
Figure 31:
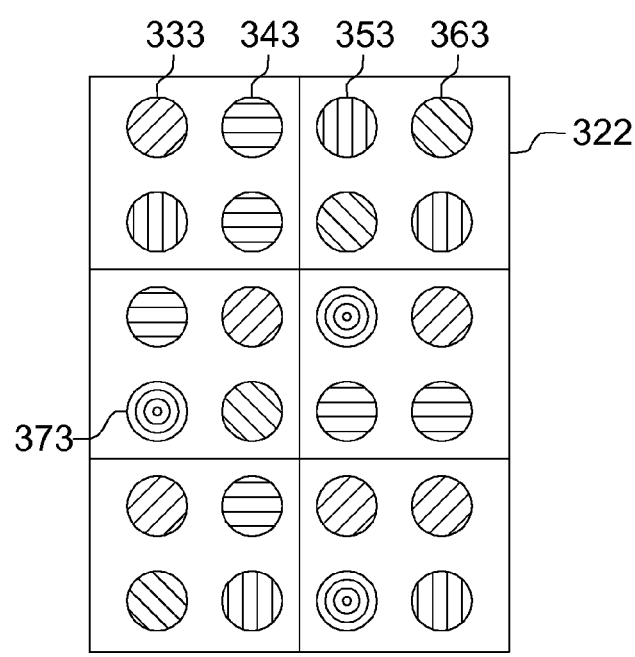
Figure 32:
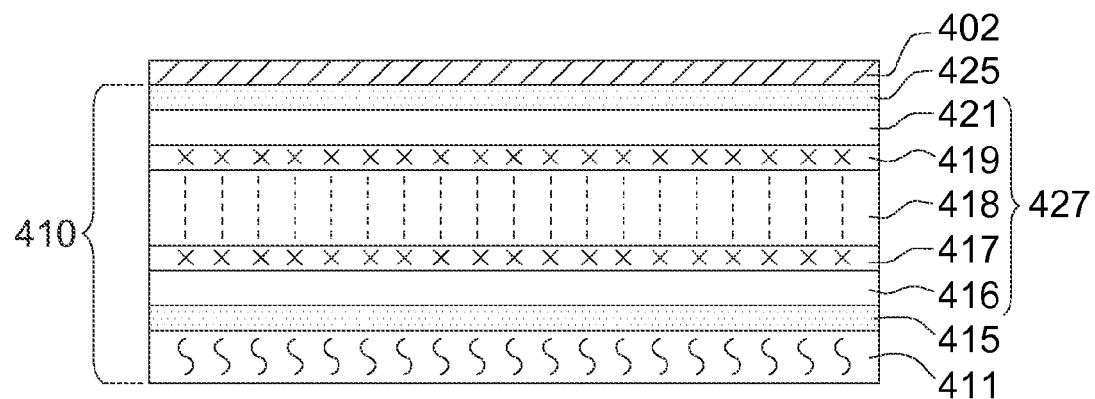
FIG. 32 illustrates a cross-section view of the display apparatus in one embodiment.
Figures 1, 33A:
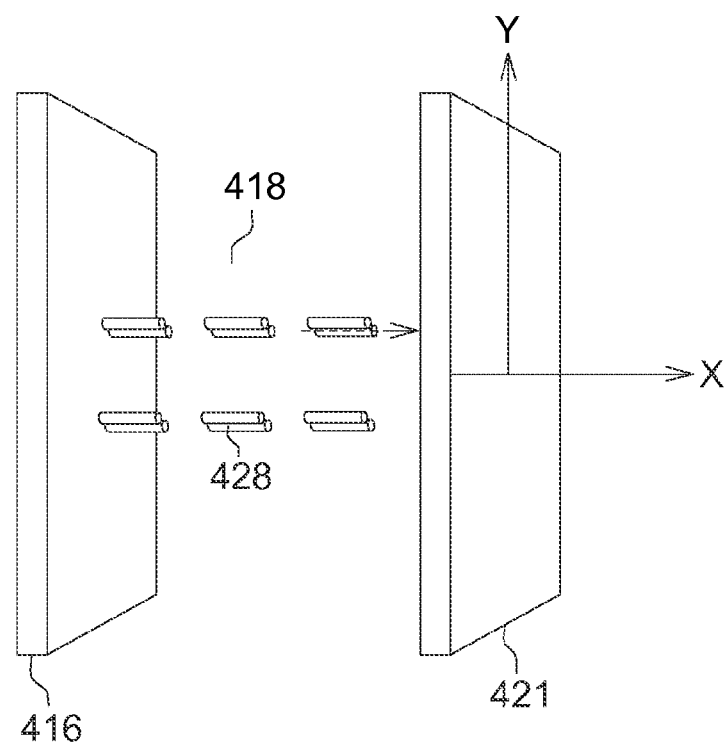
Figures 2, 33A:
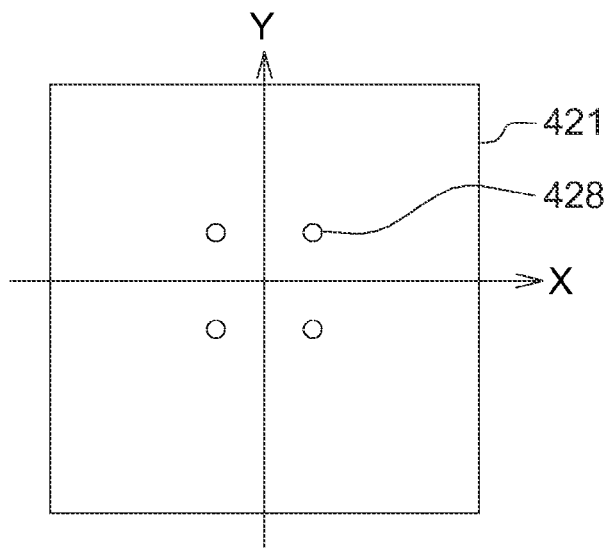
Figures 1, 33B:
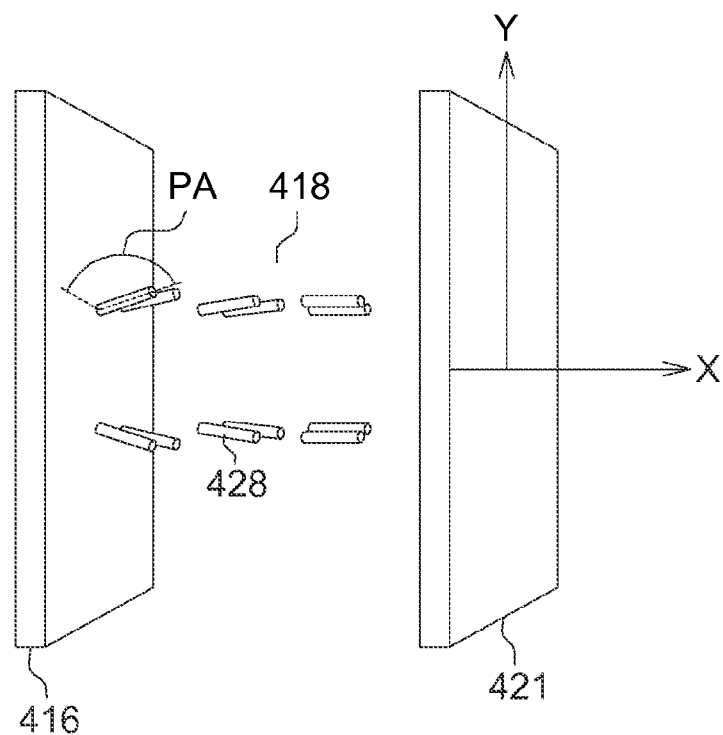
Figures 2, 33B:
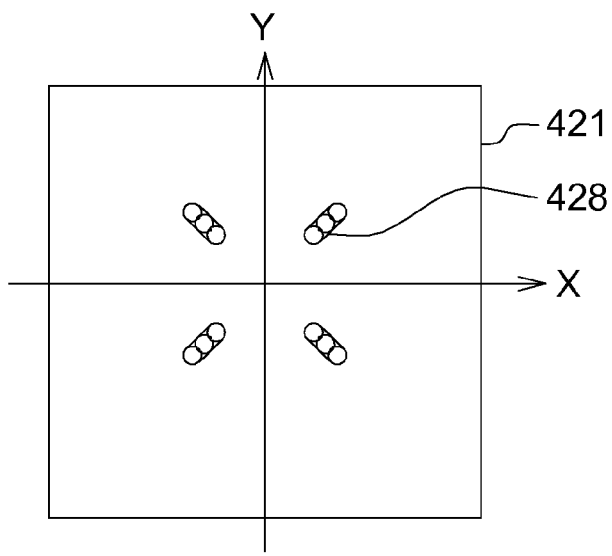
Figure 34A:
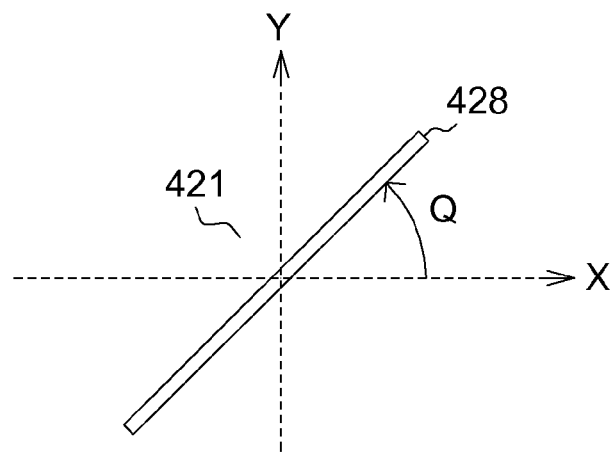
FIG. 34A illustrates a liquid crystal molecule having a liquid crystal azimuth angle due to an electrical field applied in the liquid crystal layer.
Figures 1, 34B:
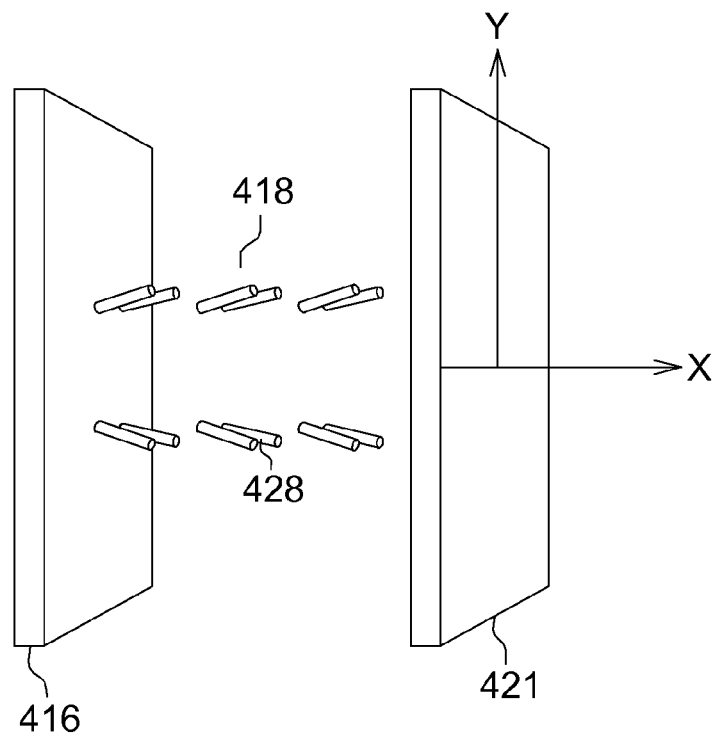
Figures 2, 34B:
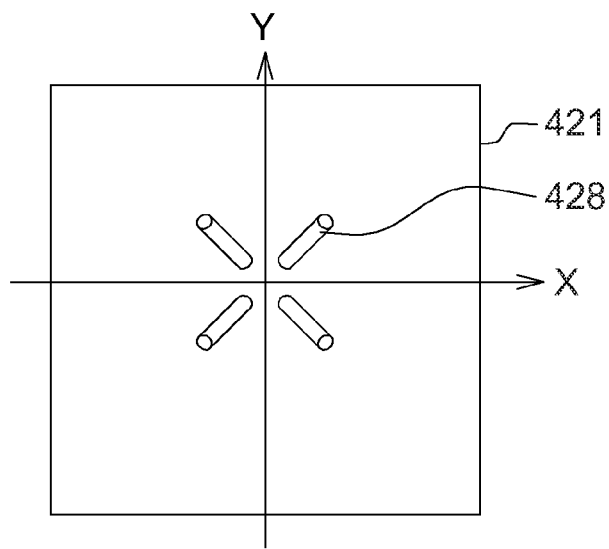
Figure 44:
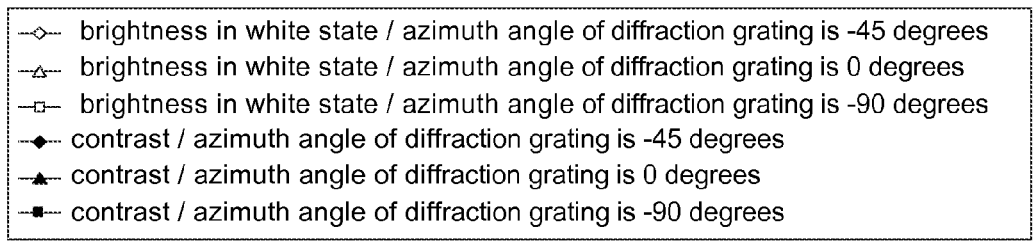
FIGS. 44, 52 and 60 illustrate the brightness and contrast in white states of the display device detected at a constant azimuth angle ψ of 0 degree and various zenith angles θ.
Figure 44:
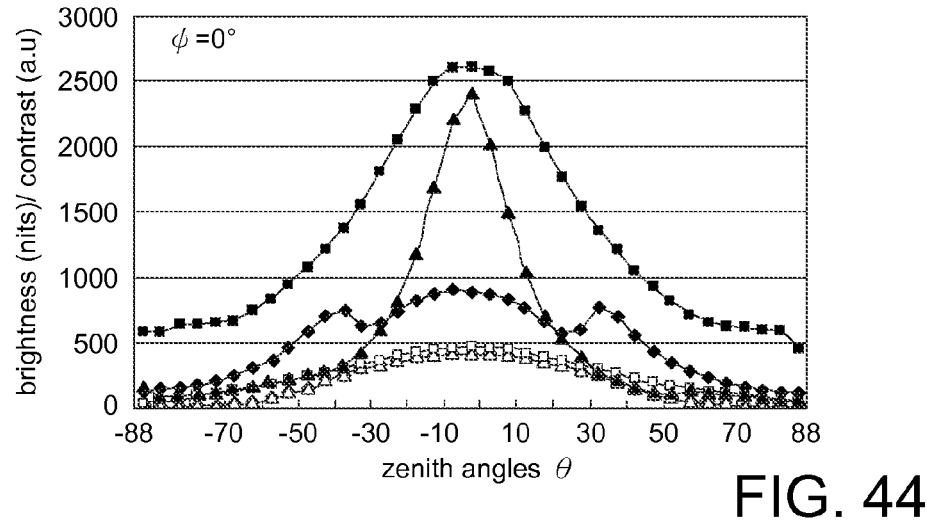
Figure 45:
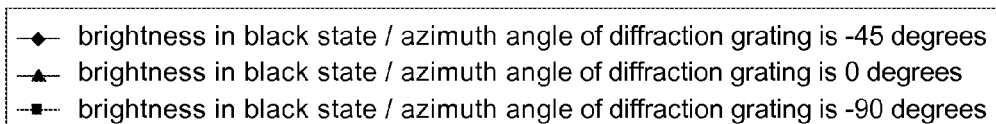
FIGS. 45, 53 and 61 illustrate the brightness and contrast in black states of the display device detected at the constant azimuth angle ψ of 0 degree and various zenith angles θ.
Figure 45:
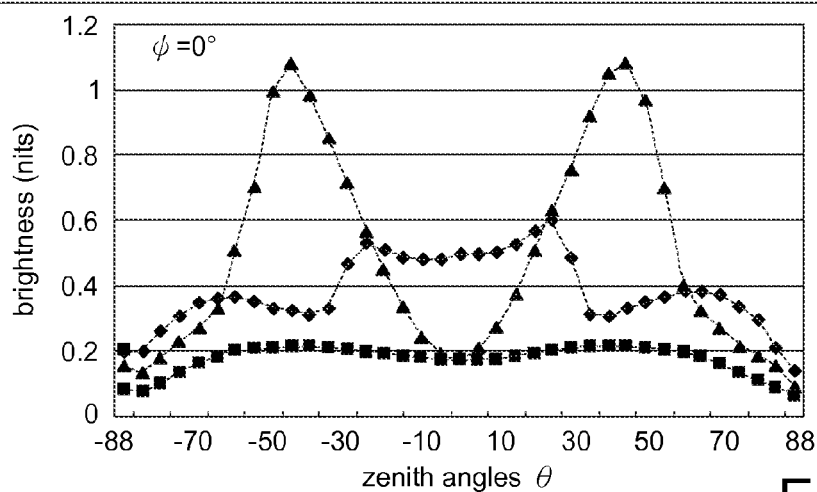
Figure 46:
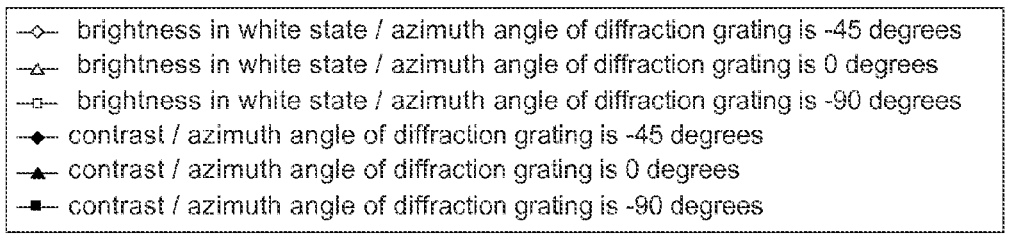
FIGS. 46, 54 and 62 illustrate the brightness and contrast in white states of the display device detected at the constant azimuth angle ψ of 90 degrees and various zenith angles θ.
Figure 46:
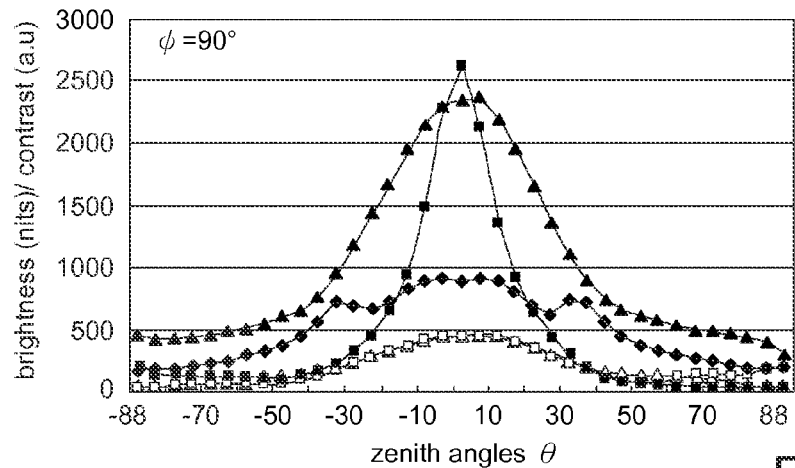
Figure 47:
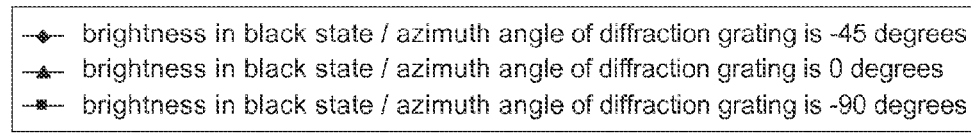
FIGS. 47, 55 and 63 illustrate the brightness and contrast in black states of the display device detected at the constant azimuth angle ψ of 90 degrees and the various zenith angles θ.
Figure 47:
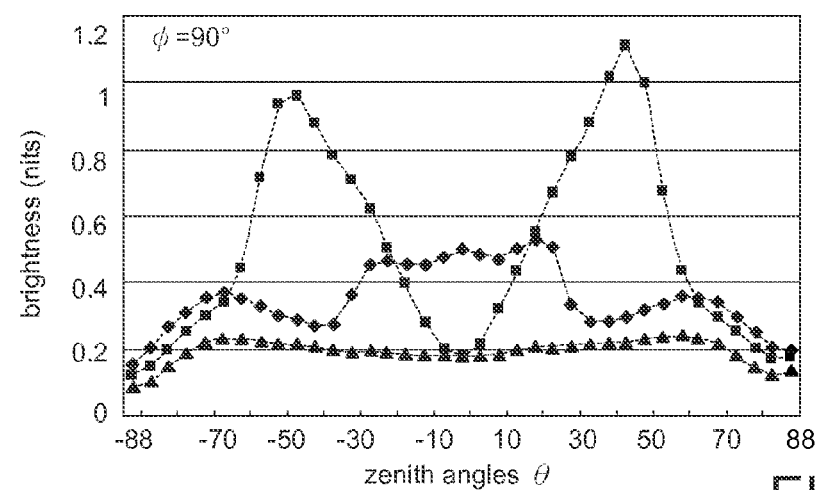
Figure 48:
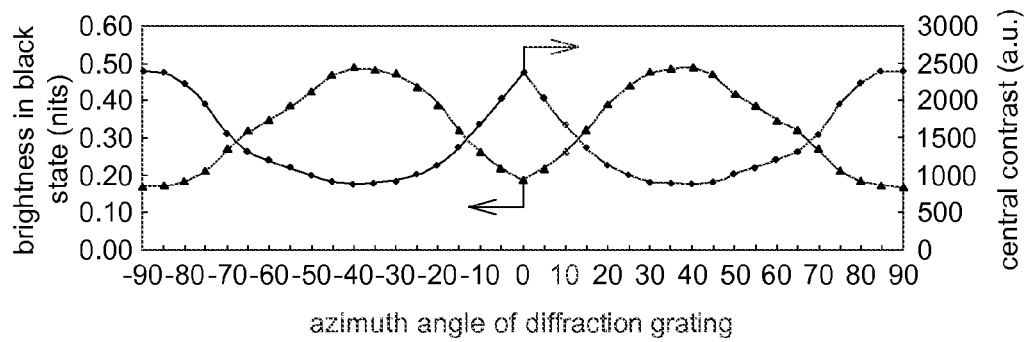
FIG. 48 shows curves of the brightness in the black state and the central contrast detected at the front view of the display devices having the diffractive optical element, wherein the diffractive optical element has the diffraction grating with single azimuth angle direction and the diffractive optical element is arranged in the various azimuth angles ψ.
Figure 52:
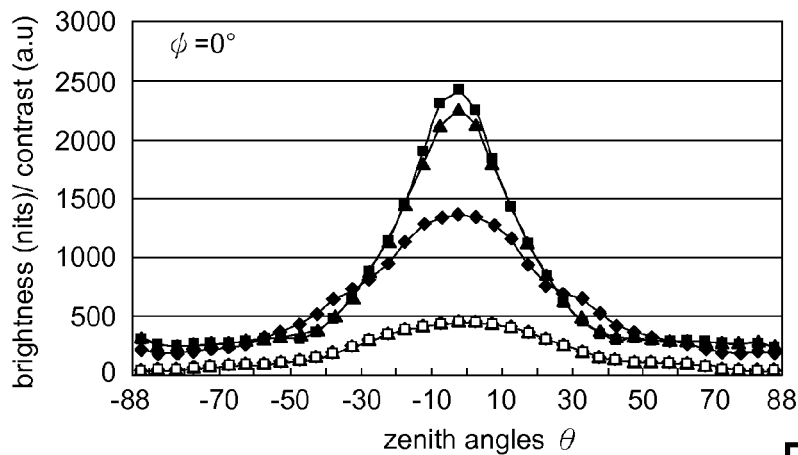
Figure 53:
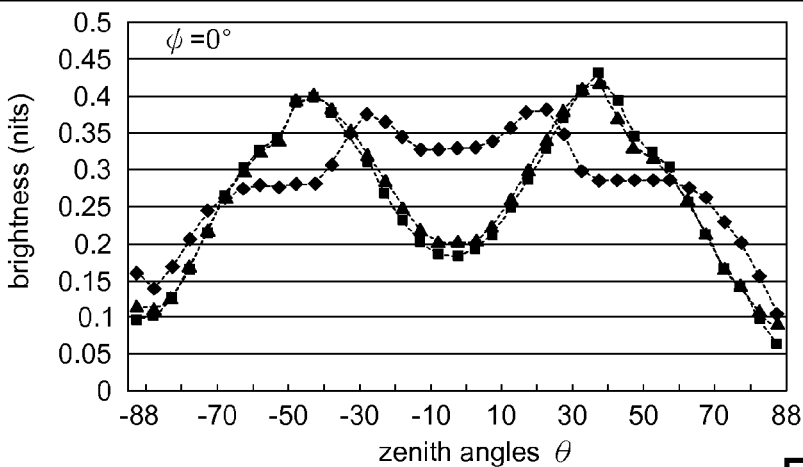
Figure 54:
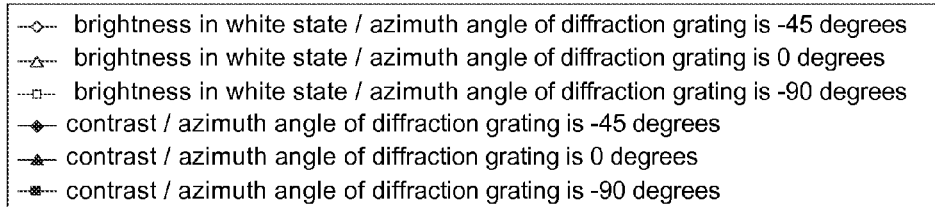
Figure 54:
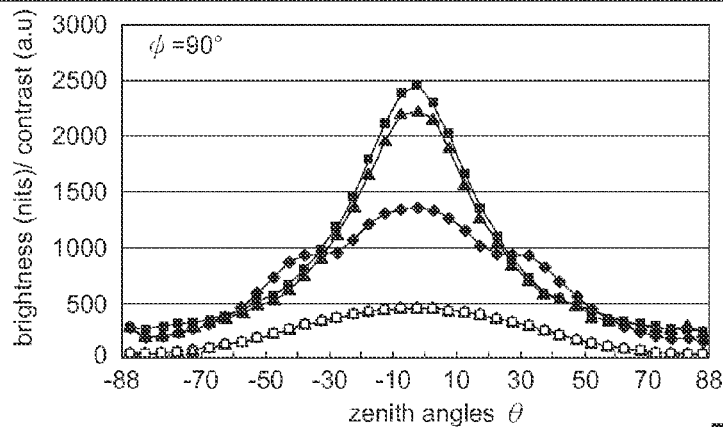
Figure 55:
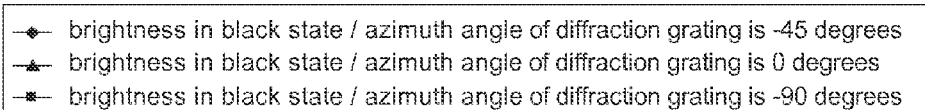
Figure 55:
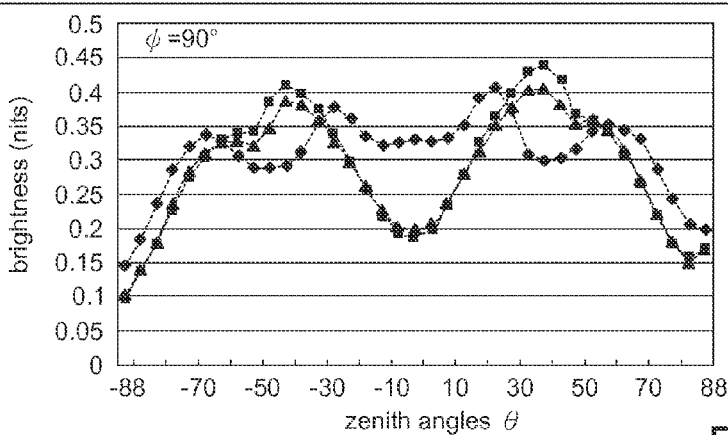
Figure 56:
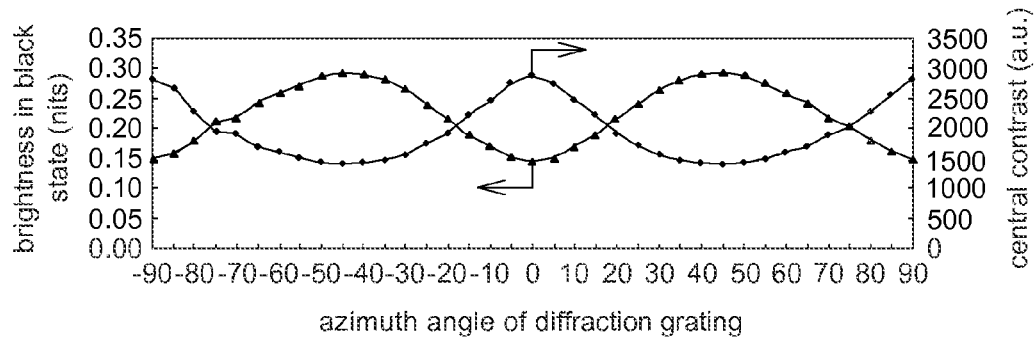
FIG. 56 shows curves of the brightness in the black state and the central contrast detected at the front view of the display devices having the diffractive optical element, wherein the diffractive optical element has the diffraction gratings with two azimuth angle direction and the diffractive optical element is arranged in the various azimuth angles ψ.
Figure 60:
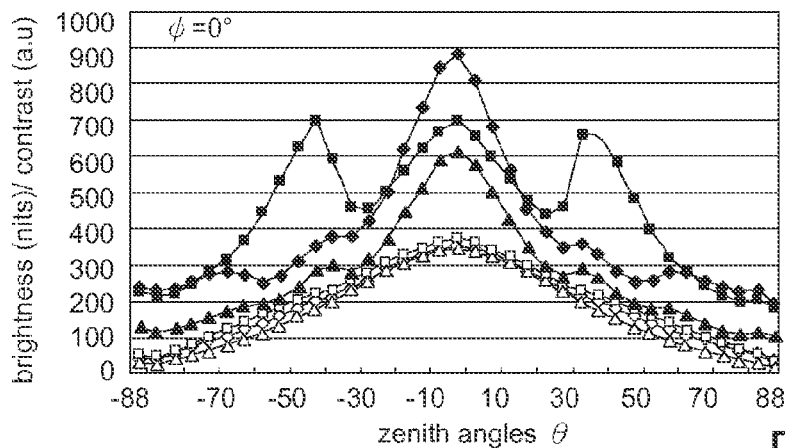
Figure 61:
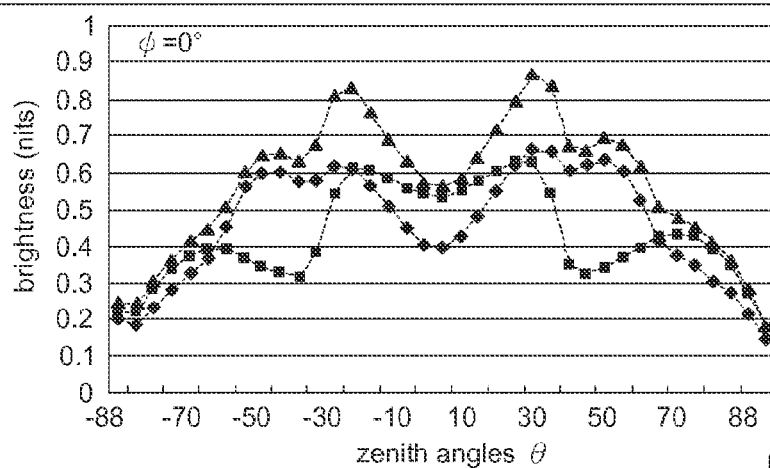
Figure 62:
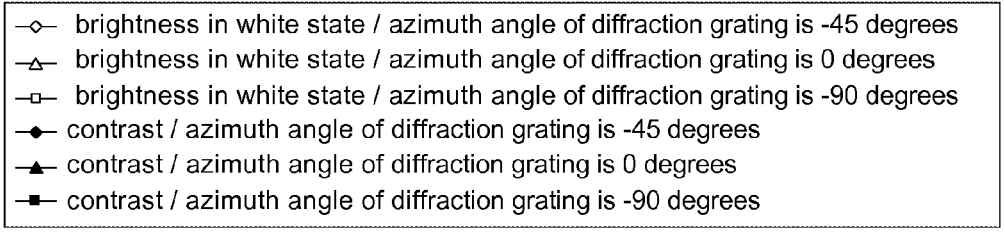
Figure 62:
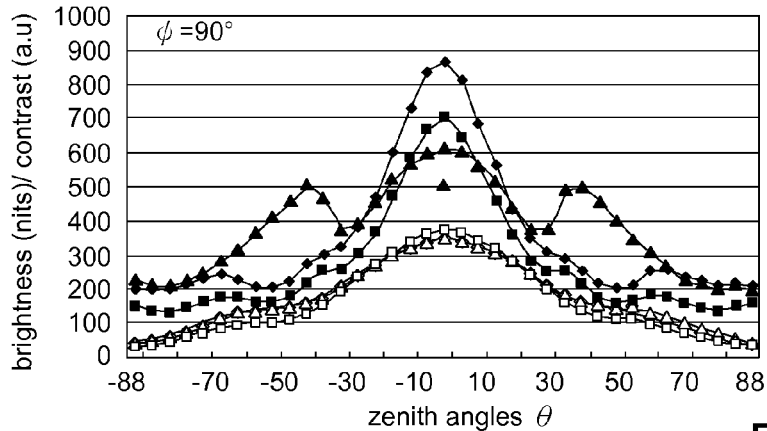
Figure 63:
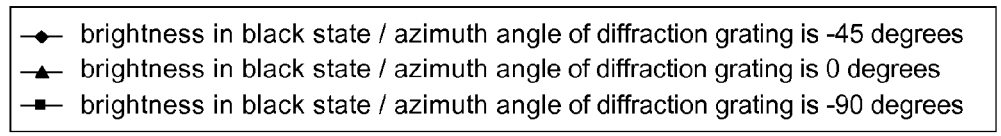
Figure 63:
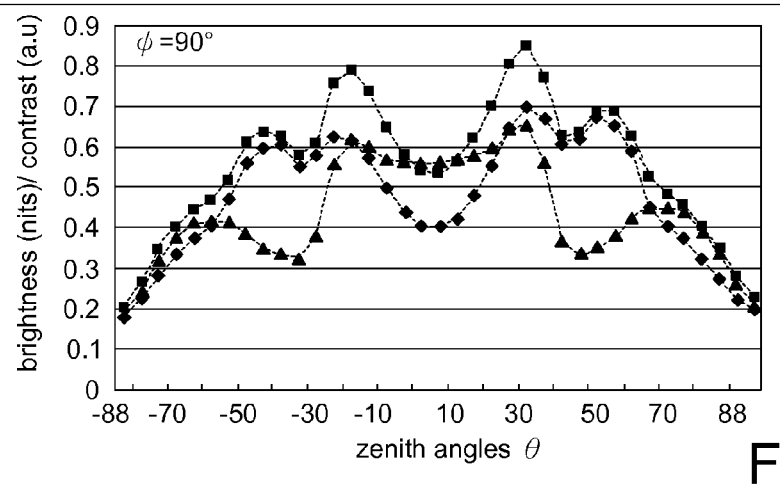
Figure 64:
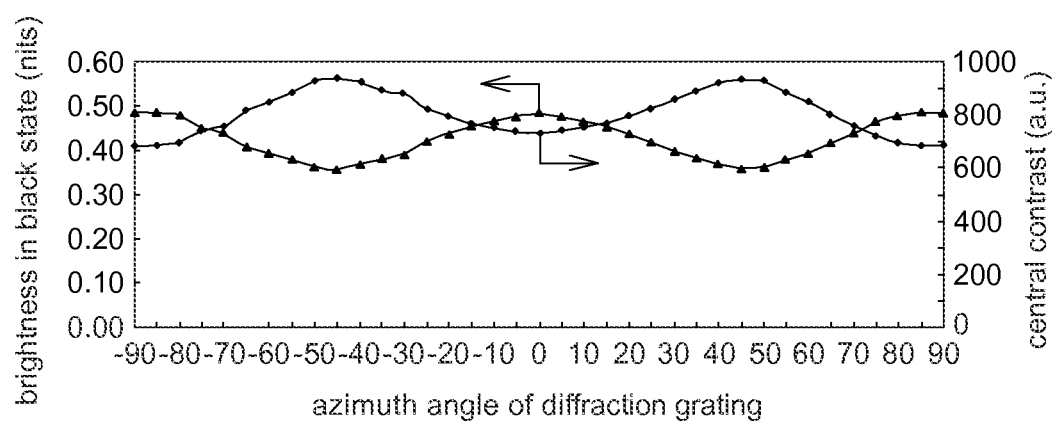
FIG. 64 shows curves of the brightness in the black state and the central contrast detected at the front view of the display devices having the diffractive optical element, wherein the diffractive optical element has the diffraction gratings with three azimuth angle direction and the diffractive optical element is arranged in the various azimuth angles ψ.

FIG. 1 illustrates a three dimensional diagram of a display apparatus according to one embodiment of the present invention. FIGS. 2-8 and 17-31 illustrate diffractive optical elements in embodiments. FIGS. 9-16 illustrate grating regions of the diffractive optical elements in embodiments. FIG. 32 illustrates a cross-section view of the display apparatus in one embodiment. FIGS. 33A-1 and 33B-1 illustrate three dimensional diagrams of the substrate and the liquid crystal layer of the display devices in embodiments, wherein no electrical field is applied in the liquid crystal layer. FIGS. 33A-2 and 33B-2 illustrates top views of the substrate and the liquid crystal layer of the display device in embodiments, wherein no electrical field is applied in the liquid crystal layer. FIG. 34A illustrates a liquid crystal molecule having a liquid crystal azimuth angle due to an electrical field applied in the liquid crystal layer. FIG. 34B-1 illustrates a three dimensional diagram of the substrate and the liquid crystal layer of the display device, wherein an electrical field is applied in the liquid crystal layer. FIG. 34B-2 illustrates a top view of the substrate and the liquid crystal layer of the display device, wherein an electrical field is applied in the liquid crystal layer. FIGS. 35-43, 49-51 and 57-59 illustrate relations between of the polarizing direction of the polarizer and the diffractive optical element. FIGS. 44, 52 and 60 illustrate the brightness and contrast in white states of the display device detected at a constant azimuth angle ψ of 0 degree and various zenith angles θ. FIGS. 45, 53 and 61 illustrate the brightness and contrast in black states of the display device detected at the constant azimuth angle ψ of 0 degree and various zenith angles θ. FIGS. 46, 54 and 62 illustrate the brightness and contrast in white states of the display device detected at the constant azimuth angle ψ of 90 degrees and various zenith angles θ. FIGS. 47, 55 and 63 illustrate the brightness and contrast in black states of the display device detected at the constant azimuth angle ψ of 90 degrees and the various zenith angles θ. FIG. 48 shows curves of the brightness in the black state and the central contrast detected at the front view of the display devices having the diffractive optical element, wherein the diffractive optical element has the diffraction grating with single azimuth angle direction and the diffractive optical element is arranged in the various azimuth angles ψ. FIG. 56 shows curves of the brightness in the black state and the central contrast detected at the front view of the display devices having the diffractive optical element, wherein the diffractive optical element has the diffraction gratings with two azimuth angle direction and the diffractive optical element is arranged in the various azimuth angles ψ. FIG. 64 shows curves of the brightness in the black state and the central contrast detected at the front view of the display devices having the diffractive optical element, wherein the diffractive optical element has the diffraction gratings with three azimuth angle direction and the diffractive optical element is arranged in the various azimuth angles ψ.

Referring to FIG. 1, the diffractive optical element 2 is disposed on a light emitting side of the display device 10 for displaying an image. The display device 10 may be incorporated with other elements, such as a touch element for forming a touch panel. The diffractive optical element 2 may be used with other elements, such as an anti-reflection film or a touch panel, and disposed on a light emitting side of the display device 10 for displaying an image. In embodiments, the display device 10 is a vertical aligned/multi-domain vertical aligned liquid crystal display device. In embodiments, the absorbing axis of the polarizer (not shown) on the light emitting side of the display device 10 is parallel to the long side of the display device 10, thus the absorbing axis of the polarizer on the light emitting side of the liquid crystal display device 10 can be defined as a X axis for defining the azimuth angle. The absorbing axis of the polarizer on the light entering side of the display device 10 is substantially perpendicular to the axis. In another embodiment, the absorbing axis of the polarizer (not shown) on the light emitting side of the display device 10 is parallel to the short side of the display device, and the absorbing axis of the polarizer on the light emitting side of the liquid crystal display device 10 is defined as a Y axis for defining the azimuth angle. The absorbing axis of the polarizer on the light entering side is substantially perpendicular to the Y axis. In embodiments, the diffractive optical element 2 may be used together with the polarizer. Otherwise, the diffractive optical element 2 may be disposed between the two polarizers. The diffractive optical element 2 may be a film having a grating, such as a phase grating, for diffracting a light emitted from the display device 10. In following description, the absorbing axis of the polarizer (not shown) on the light emitting side of the display device 10 is used for the X axis for defining the azimuth angle. In addition, an observation angle to the liquid crystal display device is presented by a zenith angle θ and an azimuth angle ψ in spherical coordinate. The azimuth angle ψ indicates an included angle on the X-Y plane from the X-axis. The zenith angle θ indicates an included angle from the Z-axis perpendicular to the X-Y plane. The positive included angle represents a counter-clockwise-direction included angle, and the negative included angle represents a clock-wise-direction included angle.

A backlight module is disposed on a side of the liquid crystal panel for providing a surface light source for the liquid crystal panel display. A direct-type backlight module or a side-type backlight module may be used.

Referring to FIG. 2, in embodiments, the diffractive optical element 32 comprises the grating region 43 and the grating region 53 separated from each other. An "ordinary region (or non-grating region)" besides the grating region 43 and the grating region 53 of the diffractive optical element 32 is a region that generates a low-degree diffraction effect. In particular, the grating region 43 and the grating region 53 can generate a high-degree effect diffraction effect of a intensity ratio of the total zero order diffraction light (the light having an emitting direction same with an incident direction) to the total non-zero order diffraction light (the light having an emitting direction different from an incident direction) lower than 100:1 to a light passing through the grating region 43 and the grating region 53 with a specific direction. The "ordinary region (or non-grating region)" generates the low-degree effect diffraction effect of a intensity ratio of the total zero order diffraction light (the light having an emitting direction same with an incident direction) to the total non-zero order diffraction light (the light having an emitting direction different from an incident direction) higher than 100:1 to a light passing through the "ordinary region (or non-grating region)", so as to increase penetration quantity of the light. Alternatively, the "ordinary region (or non-grating region) passes through no light almost. That is, a light-opaque region can have the similar effect with the "ordinary region (or non-grating region). The grating regions 43 and the grating regions 53 are arranged in rows. The grating regions 43 and the grating regions 53 arranged in alternation constitute columns. The grating region 43 and the grating region 53 respectively have the diffraction grating 44 and the diffraction grating 54. The diffraction grating 44 and the diffraction grating 54 respectively have constant period and uniform directions (azimuth angles). The diffraction grating 44 having constant period represents that the connecting lines of the wave crests (or wave troughs) of the diffraction grating 44 have a substantially constant gap distance between the connecting lines. The diffraction grating 54 having constant period represents that the connecting lines of the wave crests (or wave troughs) of the diffraction grating 54 have a substantially constant gap distance between the connecting lines.

Regarding to formation for the diffractive optical element, Taiwan application Serial No. 99119949 is incorporated herein as a reference.

In embodiments, the direction of the diffraction grating is the direction of the connecting line of the wave crests (or the wave troughs) of the diffraction grating structure, in other words, the direction of the ridge (groove). In embodiments, the direction of the diffraction grating of the grating region is indicated by a solid line. An included angle between the direction of the diffraction grating and the X-axis is the azimuth angle τ of the diffraction grating.

In one embodiment, the period of the diffraction grating represents a closest gap distance between the wave crests (or a closest gap distance between the wave troughs. For example, the period D1 of the diffraction grating 44 is 1 μm, indicating that the gap distance between the wave crests of the diffraction grating structure of the grating region 43 is 1 μm. The period D2 of the diffraction grating 54 may be 1 μm. The direction of the diffraction grating 44 is different from the direction of the diffraction grating 54. The direction of the diffraction grating 44 may be perpendicular to the direction of the diffraction grating 54. In this case, for example, the azimuth angle τ1 of the diffraction grating 44 is 90 degrees. The azimuth angle of the diffraction grating 54 is 0 degree. The grating region 43 and the grating region 53 may have spherical shapes respectively having a diameter K1 and a diameter K2, such as 28 μm-29 μm. A refractive index of a material of the diffraction grating may be about 1.49. A height between the wave crest and the wave trough of the diffraction grating structure is about 0.4 μm. For example, the refractive index of the material, the gap distance between the wave crests, or the height between the wave crest and the wave trough of the diffraction grating structure are designed properly, for generating a high-degree effect diffraction effect of a intensity ratio of the total zero order diffraction light (the light having an emitting direction same with an incident direction) to the total non-zero order diffraction light (the light having an emitting direction different from an incident direction by a deflection angle bigger than 15 degrees) lower than 100:1 to a light passing through the diffraction grating structure with a specific direction. The non-grating region is designed properly for generating the low-degree effect diffraction effect of an intensity ratio of the total zero order diffraction light (the light having an emitting direction same with an incident direction) to the total non-zero order diffraction light (the light having an emitting direction different from an incident direction by a deflection angle bigger than 15 degrees) higher than 100:1 to a light passing through the non-grating region. The design method for the non-grating region is not described in detail herein.

In other embodiments, the single grating region may have diffraction gratings having the same azimuth angle and various periods. For example, the single grating region has diffraction gratings having two kinds of the closest gap distances between connecting lines of wave crests (or wave troughs), substantially 1 μm and 0.5 μm. An area of the grating region may occupy 17.5%~94% of an area of the diffractive optical element.

Referring to FIG. 2, in a line constituted by the grating region 43 and the grating region 53 arranged in alternation, the closest gap distance between the grating region 43 and the grating region 53 may be constant or varied according to actual demands. For example, the closest gap distances S1, S2 of the grating regions 43 and the grating regions 53 may be 1 μm-15 μm, such as 1 μm, 9 μm, or 15 μm. In other embodiments, the gap distance S1 is 9 μm, and the gap distance S2 is 15 μm. In another embodiment, the closest gap distance between the grating region 43 and the grating region 53 may be 0 or negative that is the grating region 43 and the grating region 53 have an overlapping area therebetween. In another embodiment, the closest gap distance between the grating regions 43 or between the grating regions 53 may be zero 0 or negative that is the grating regions 43 have an overlapping area therebetween, or the grating regions 53 have an overlapping area therebetween.

Referring to FIG. 2, for example, in a line constituted by the grating regions 43 or in a line constituted by the grating regions 53, the closest gap distance between the grating regions 43 or the closest gap distance between the grating regions 53 may be adjusted to be constant or varied according to actual demands. In one embodiment, the closest gap distance S4 between the grating regions 43 and the closest gap distance S5 between the grating regions 53 are respectively 1 μm-15 μm, such as 1 μm and 13 μm. In another embodiment, the closest gap distance S4 between the grating regions 43 and the closest gap distance S5 between the grating regions 53 may be 0 or negative that is the grating region 43 and the grating region 53 have an overlapping area therebetween. In another embodiment, the closest gap distance between the grating regions 43 or between the grating regions 53 may be zero 0 or negative that is the grating regions 43 have an overlapping area therebetween, or the grating regions 53 have an overlapping area therebetween.

Figure 3:
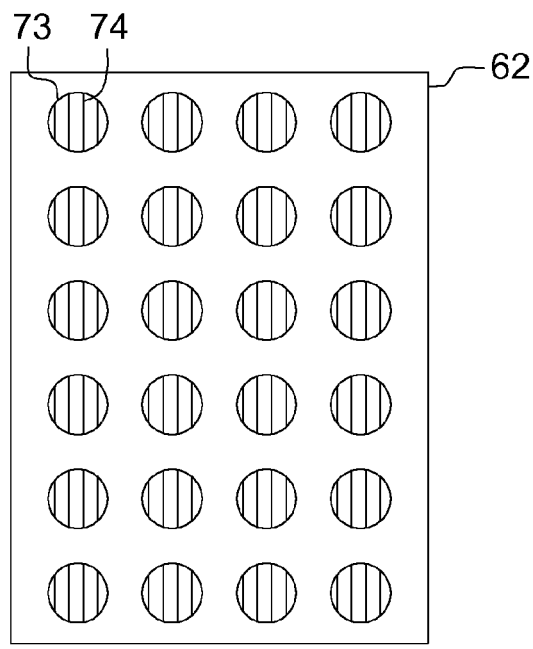
Figure 4:
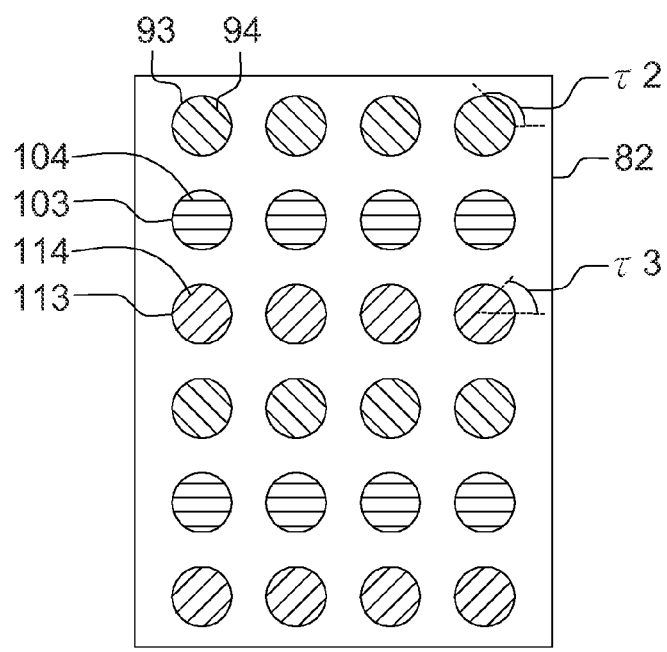

The diffractive optical element 62 in FIG. 3 is different from the diffractive optical element 32 in FIG. 2 in that the diffractive optical element 62 has a grating region 73 having a diffraction grating 74 with a constant azimuth angle. The diffractive optical element 82 in FIG. 4 is different from the diffractive optical element 32 in FIG. 2 in that the diffractive optical element 82 comprises grating regions 93, 103 and 113 respectively having diffraction gratings 94, 104 and 114 with different azimuth angles. For example, the azimuth angle τ2 of the diffraction grating 94 is 135 degrees, the azimuth angle of the diffraction grating 104 is 0 degree, and the azimuth angle τ3 of the diffraction grating 114 is 45 degrees.

Figure 5:
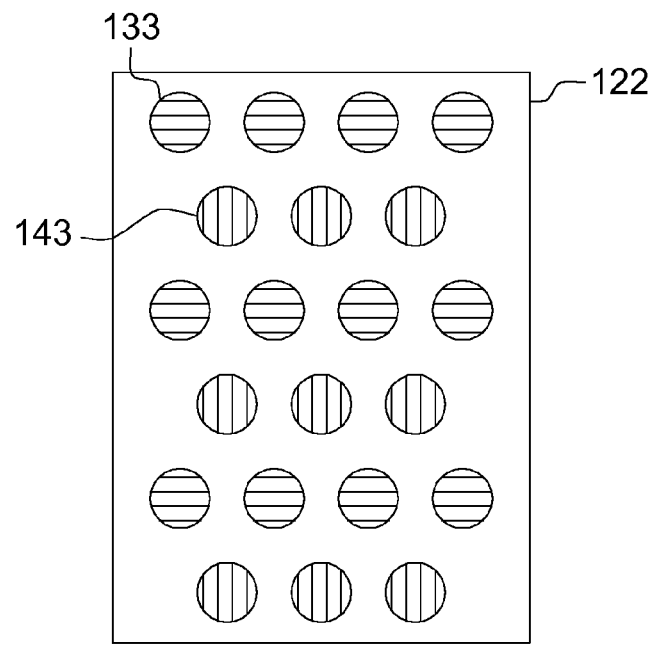

The diffractive optical element 122 in FIG. 5 is different from the diffractive optical element 32 in FIG. 2 in that the grating regions 133 and the grating regions 143 are respectively arranged in rows, and the grating regions 133 and the grating regions 143 are arranged in alternation in rows vertically.

Figure 6:
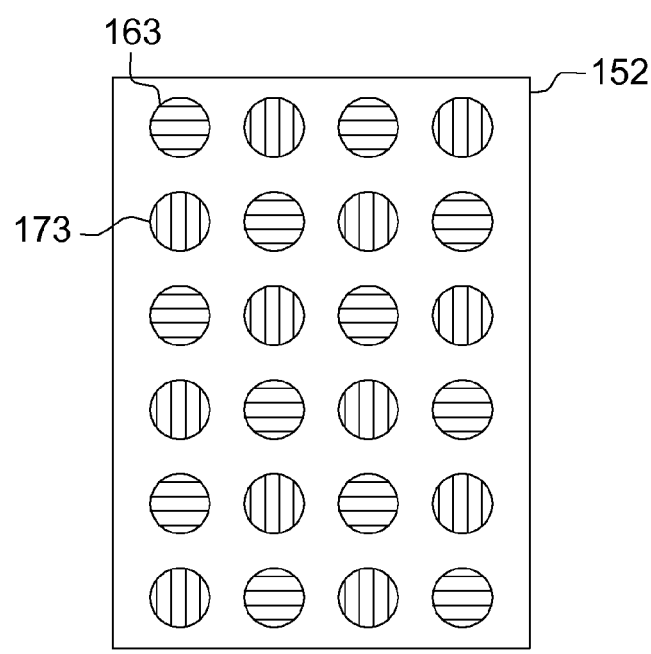

The diffractive optical element 152 in FIG. 6 is different from the diffractive optical element 32 in FIG. 2 in that all the grating regions 163 and the grating regions 173 are arranged in alternation.

Figure 7:
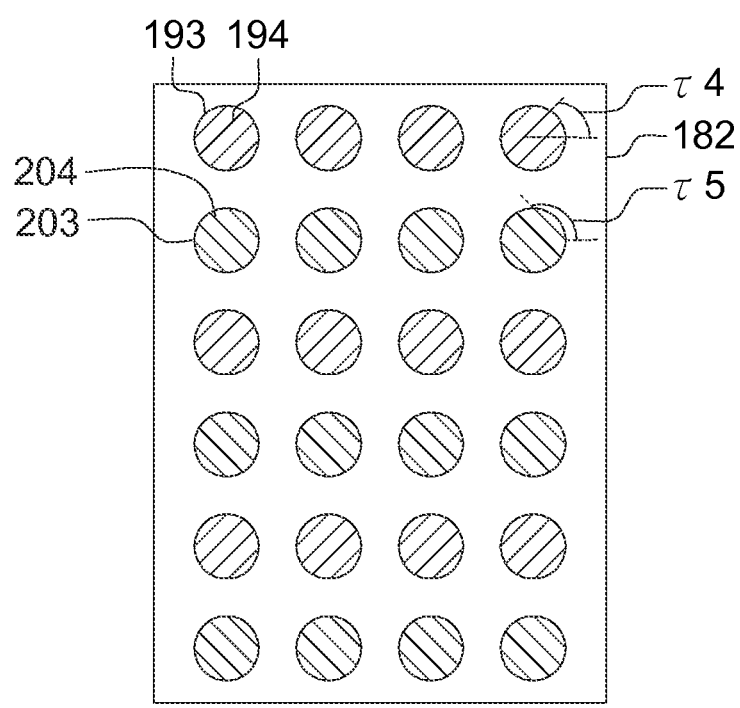

The diffractive optical element 182 in FIG. 7 is different from the diffractive optical element 32 in FIG. 2 in that the diffraction grating 194 of the grating region 193 and the diffraction grating 204 of the grating region 203 have azimuth angles other than 0 degree and 90 degrees. For example, the azimuth angle T4 of the diffraction grating 194 is 45 degrees. The azimuth angle T5 of the diffraction grating 204 is 135 degrees.

Figure 8:
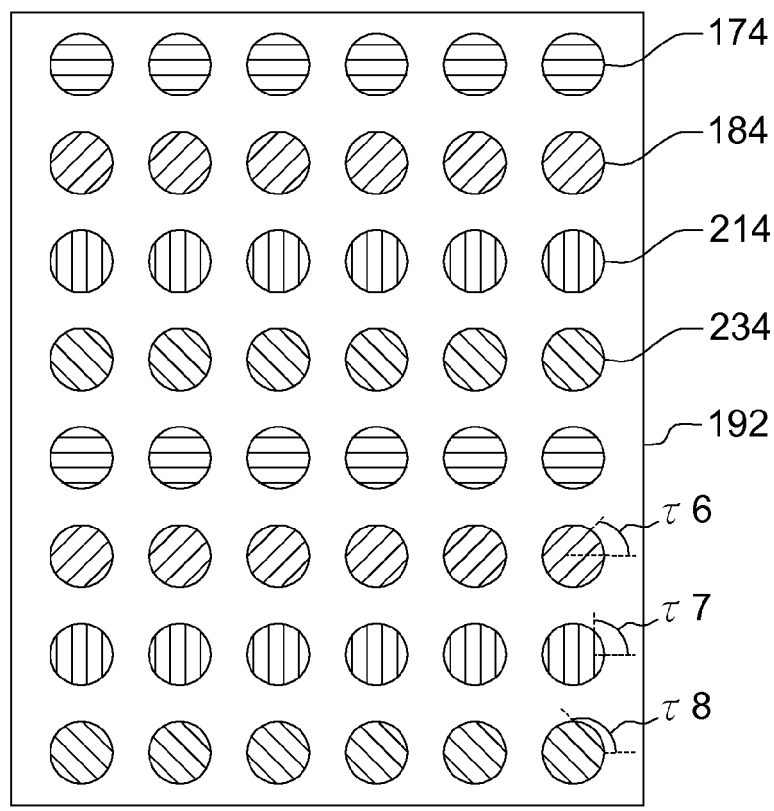
Figure 9:
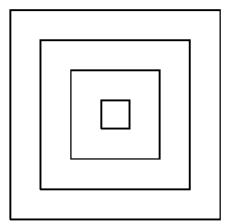
FIGS. 9-16 illustrate grating regions of the diffractive optical elements in embodiments.
Figure 10:
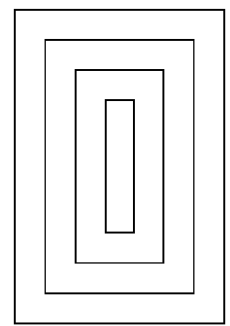
Figure 11:
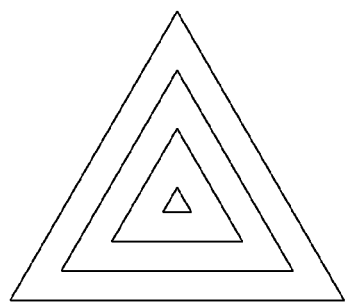
Figure 12:
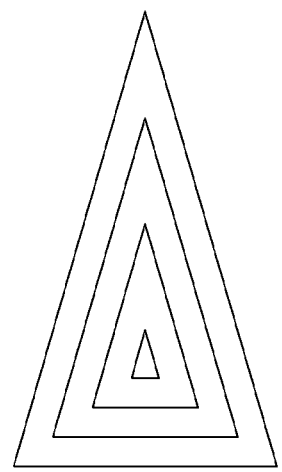

In one embodiment, the diffractive optical element may have grating region at least having four directions of diffraction grating, respectively. Referring to FIG. 8, for example, the azimuth angle of the diffraction grating 174 of the diffractive optical element 192 is 0 degree. The azimuth angle τ6 of the diffraction grating 184 is 45 degrees. The azimuth angle τ7 of the diffraction grating 214 is 90 degrees. In addition, the azimuth angle τ8 of the diffraction grating 234 is 135 degrees. In another embodiment, in the diffractive optical element having the diffraction gratings of more than three kinds of the azimuth angles, the grating regions having different azimuth angles may be arranged in alternation.

Figure 13:
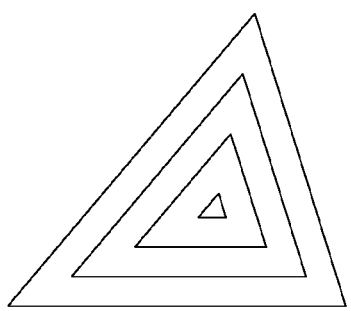
Figure 14:
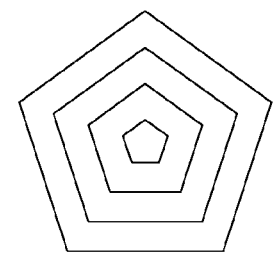
Figure 15:
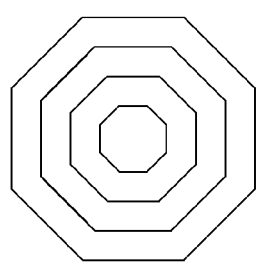
Figure 16:
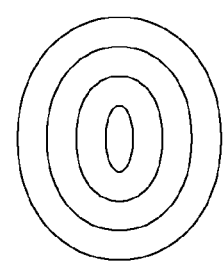

In one embodiment, the diffraction grating direction of the single grating region is not limited to only one direction. The single grating region may have the diffraction grating of various azimuth angles. In addition, the grating region is not limited to the spherical shape as shown in FIGS. 2-8. For example, in embodiments, the single grating region having four kinds of the diffraction grating directions may comprise square shape (FIG. 9), rectangular shape (FIG. 10) or other quadrilateral shapes. For example, the single grating region having three kinds of the diffraction grating directions may comprise regular triangle shape (FIG. 11), isosceles triangle shape (FIG. 12), non-isosceles triangle shape (FIG. 13). For example, the single grating region having multiple kinds of the diffraction grating directions may comprise regular pentagon shape (FIG. 14) or other regular pentagon shapes; or regular octagon shape (FIG. 15) or other octagon shapes; or ellipse shape (FIG. 16) or other curved shapes; or other suitable shapes. In addition, the effect from the grating of polygon shape can also be obtained a combination of the gratings of different directions, and therefore the present disclosure is not limited to the grating of polygon shape.

Figure 17:
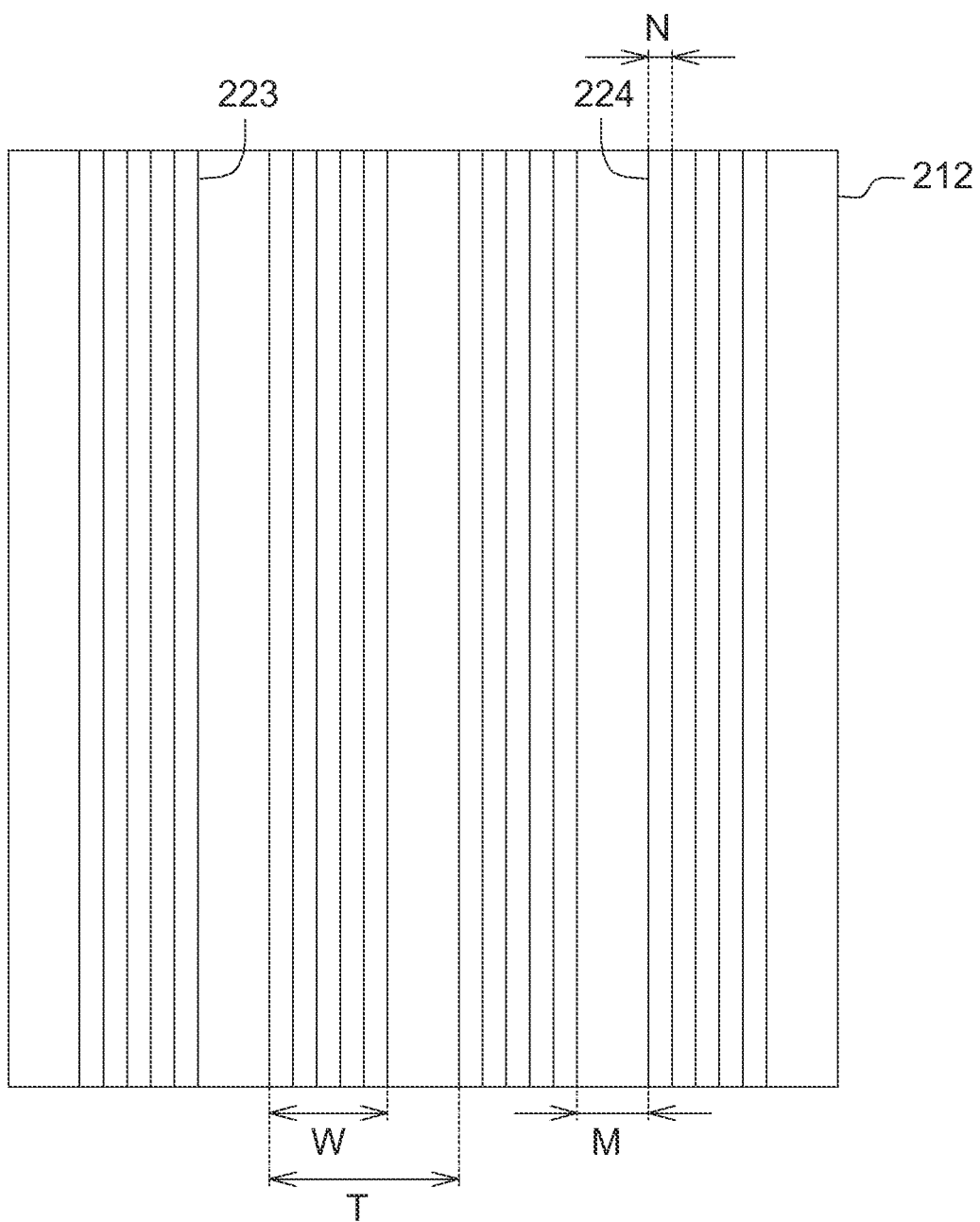

In some embodiments, the diffractive optical element 212 comprises the grating region 223 as shown in FIG. 17. Referring to FIG. 17, in one embodiment, the period T of the grating region 223 is 20~250 μm. A width W of the grating region 223 is 19 μm-237.5 μm. The period N of the diffraction gratings 224 is 1 μm. The gap distance M between the diffraction gratings 224 is 1 μm-12.5 μm. In another embodiment, the gap distance between the grating regions 223 may be 0 or negative. The negative gap distance means the adjacent grating regions 223 have an overlapping region therebetween. The azimuth angle of the diffraction grating 224 is 90 degrees.

Figure 18:
Figure 19:
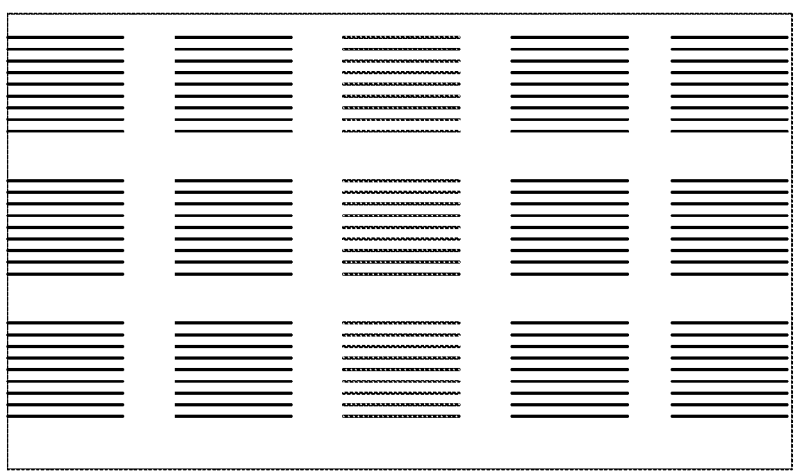
Figure 20:
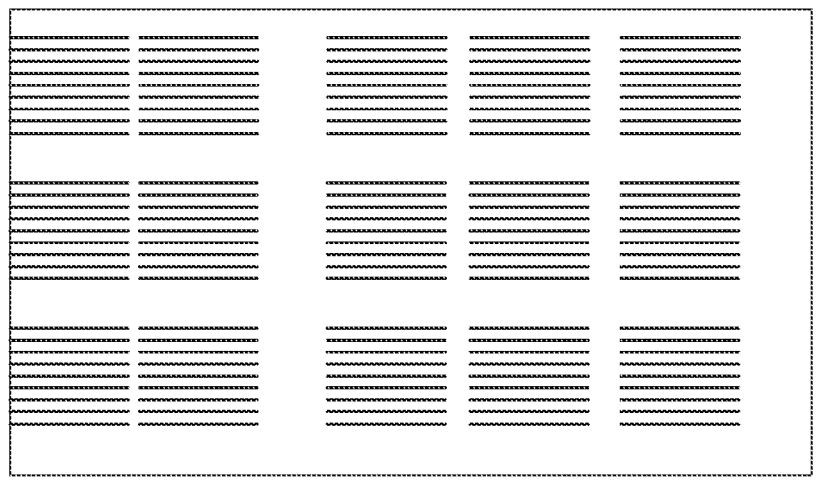
Figure 21:
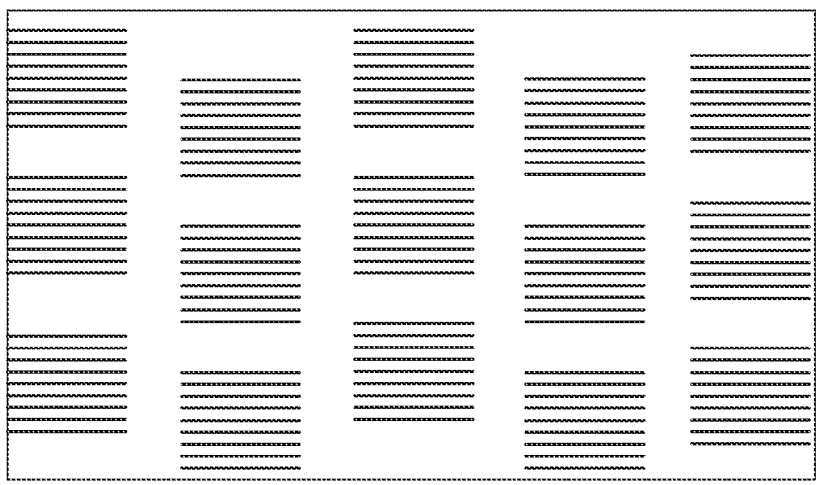
Figure 22:
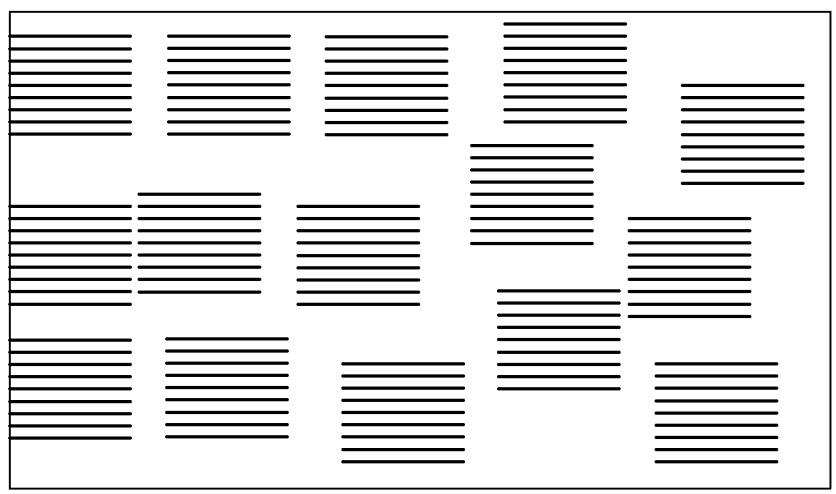
Figure 23:
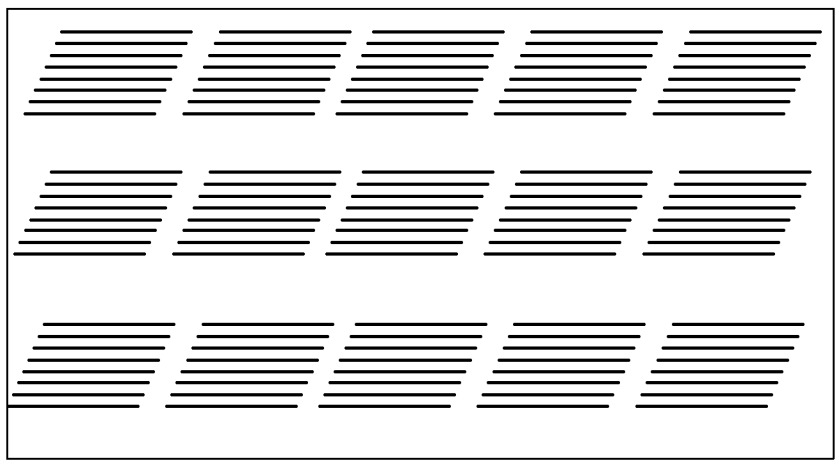
Figure 24:
Figure 25:
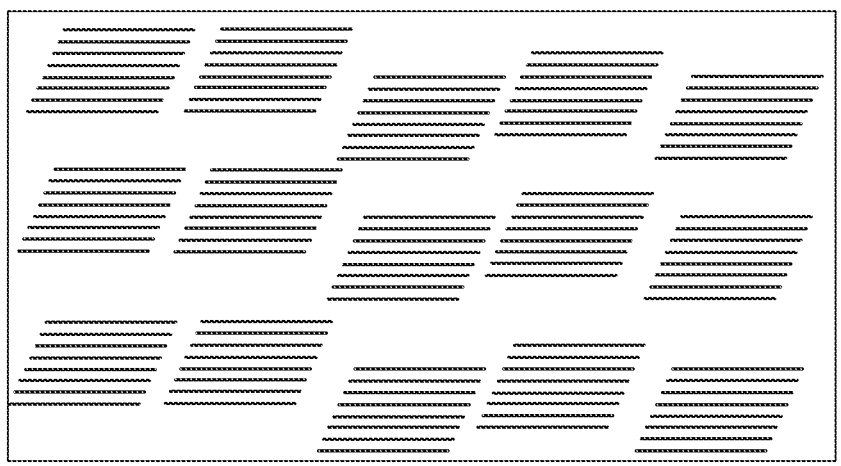
Figure 26:
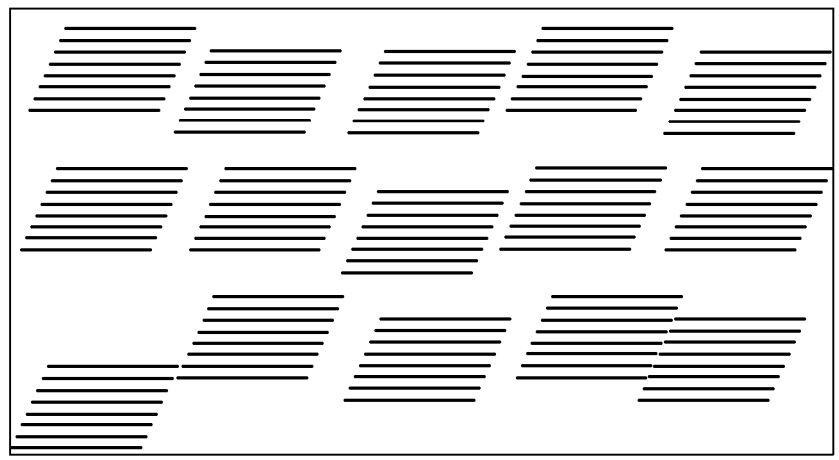
Figure 27:
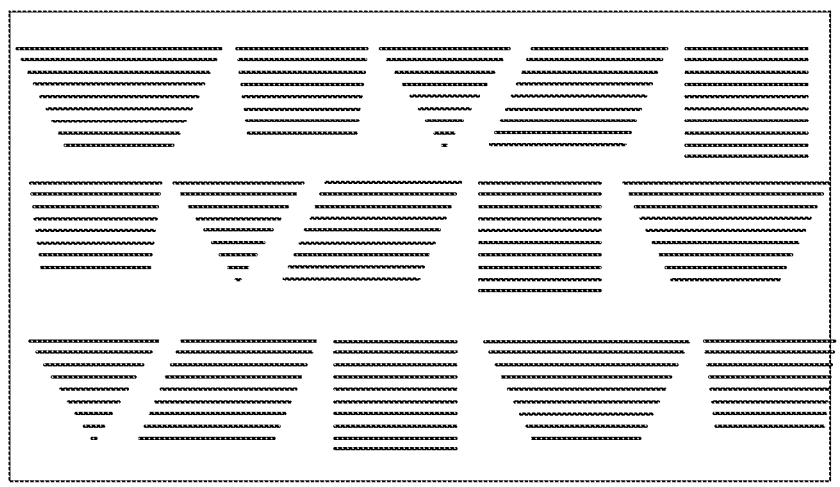

The diffractive optical element 212A in FIG. 18 is different from the diffractive optical element 212 in FIG. 17 in that the azimuth angle of the diffraction grating 224A of the grating region 223A is 0 degree. In other embodiments, the grating regions are not limited to the stripe shape of the grating region 223A as shown in FIG. 18, and may having square shape patterns with a constant gap distance therebetween as shown in FIG. 19, the square shape patterns with various gap distance therebetween as shown in FIG. 20, the square shape patterns arranged in alternation as shown in FIG. 21, the square shape patterns arranged randomly as shown in FIG. 22, rhombus patterns with a constant gap distance therebetween as shown in FIG. 23, the rhombus patterns with various gap distances as shown in FIG. 24, the square shape patterns arranged randomly as shown in FIG. 25, the square shape patterns arranged randomly as shown in FIG. 26, a combination of various shape patterns as shown in FIG. 27. In some embodiments, the patterns as shown in FIG. 27 can be arbitrarily changed or placed upside down. In embodiments, the patterns of the grating region may be changed according to actual demands properly.

Figure 28:
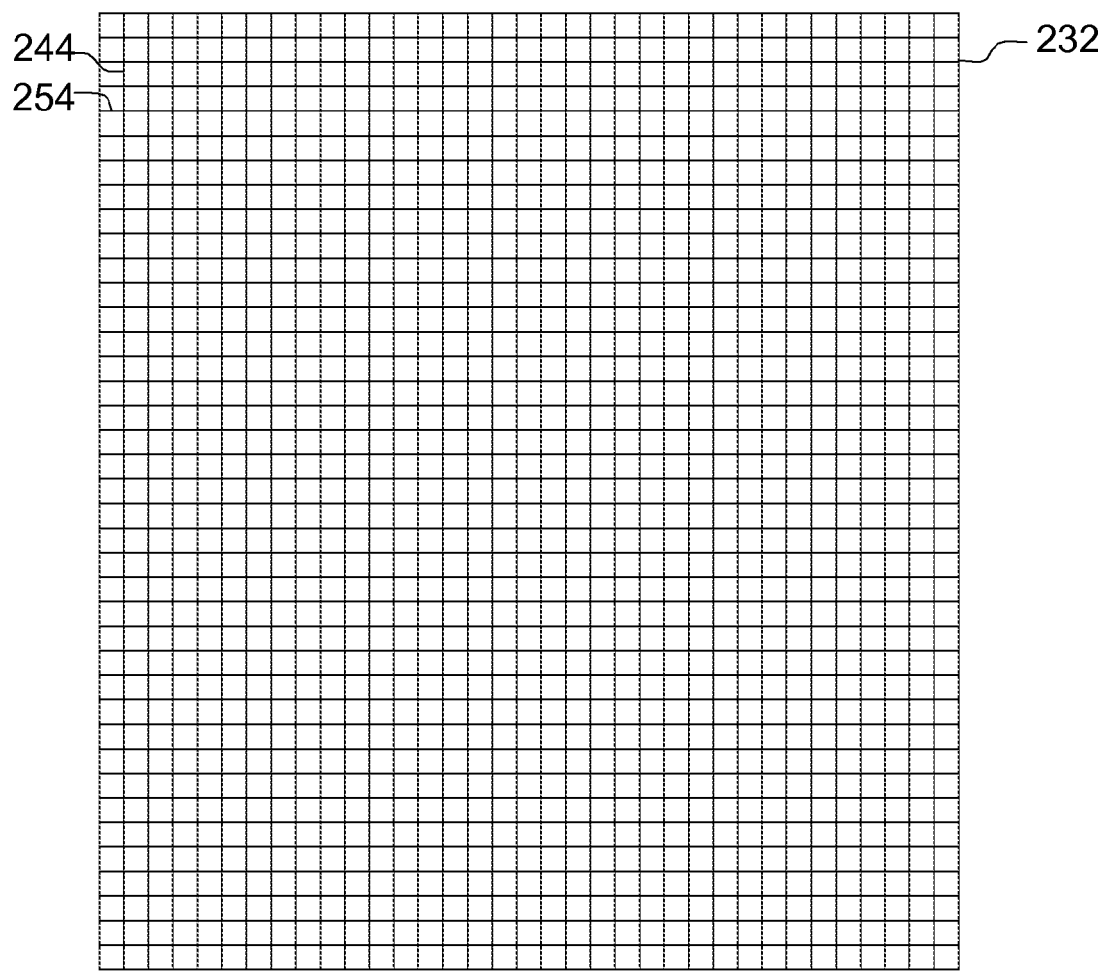
Figure 29:
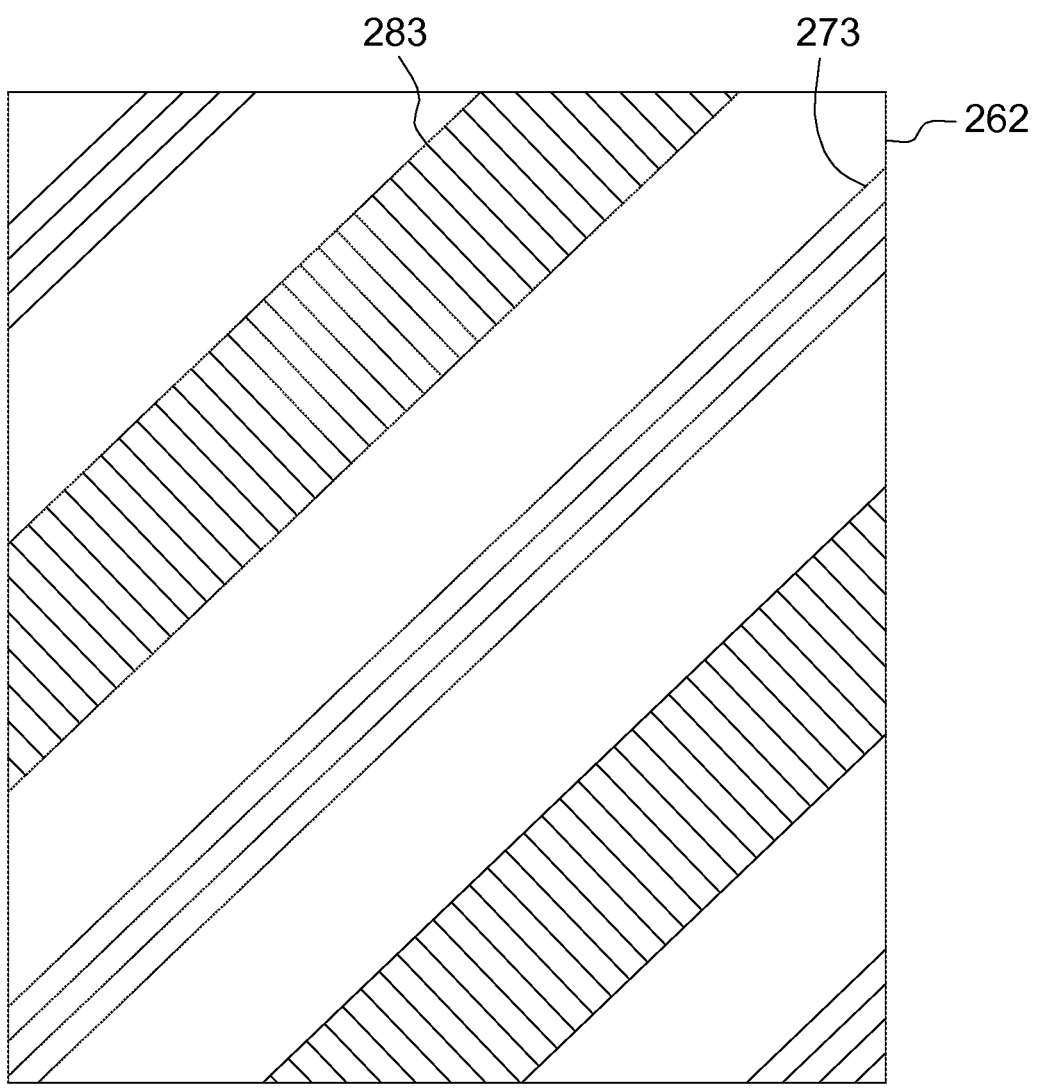
Figure 30:
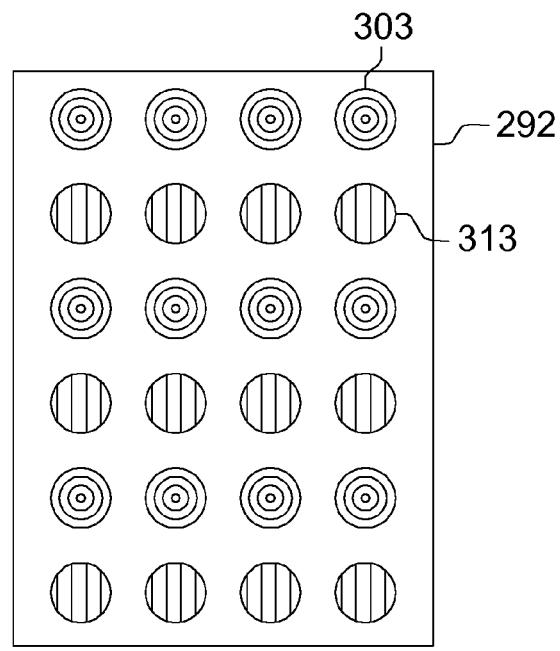

Referring to FIG. 28, the diffractive optical element 232 may also comprise the diffraction grating 244, the diffraction grating 254. The diffractive optical element 232 may also be regarded as a result of the grating region having the diffraction grating 244 and the grating region having the diffraction grating 254 overlapped with each other. In one embodiment, the diffractive optical element 262 comprises the grating region 273 and the grating region 283 as shown in FIG. 29. The diffractive optical element 292 may also comprise the grating region 303 and the grating region 313 as shown in FIG. 30.

The grating regions of the diffractive optical element are not limited to order arrangement, and can be adjusted into disorder arrangement according to actual demands. Referring to FIG. 31, for example, the diffractive optical element 322 may also comprise the grating region 333, the grating region 343, the grating region 353, the grating region 363 and the grating region 373 disorderly.

In embodiments, the many diffractive optical elements can be overlapped for using according to actual demands. The different diffractive optical elements may be arranged by overlapping the grating regions having the same pattern, i.e. the same shape or the same diffraction grating, with each other, or by overlapping the grating regions having different patterns, i.e. different shapes or diffraction gratings of different characteristics, with each other. Referring to FIG. 2, for example, in a case of overlapping one diffractive optical element 32 with another diffractive optical element 32, the grating region 53 of the one diffractive optical element 32 is overlapped with the grating region 43 of the another diffractive optical element 32, and the grating region 43 of the one diffractive optical element 32 is overlapped with the grating region 53 of the another diffractive optical element 32. For example, when using a laser light source and the incidence angle of laser beam being normal to a single-layer diffractive optical element 32 as shown in FIG. 2, diffraction lights of two directions such as 0/180 degrees or 90/270 degrees are formed. Conversely, when using the laser light source and the incidence angle of laser beam being normal to a stacked structure constituted by multi-layer diffractive optical elements, not only the transmission light having the diffraction directions as formed by the single-layer diffractive optical element, but also transmission lights having other diffraction directions such as oblique directions. Cause of this is from the additional the periodic structure for the oblique direction. In addition, it is presumed that one grating region close to a light source diffracts a normal incident light, and the diffracted light is further diffracted by another grating region away from the light source. The azimuth angles of the two grating regions are different. Therefore, besides the diffraction lights of two directions such as 0/180 degrees or 90/270 degrees are generated by the single-layer diffractive optical element, additional diffraction lights of other oblique directions such as 45 degrees, 135 degrees, 225 degrees, or 315 degrees are formed.

In embodiments, the stacked structure constituted by the diffractive optical elements of various layers may be constituted by overlapping the grating regions of the same pattern according to actual demands. Referring to FIG. 2, in one embodiment, for example, one diffractive optical element 32 is overlapped with another diffractive optical element 32. The grating region 43 of the one diffractive optical element 32 is overlapped with the grating region 43 of the another diffractive optical element 32. The grating region 53 of the one diffractive optical element 32 is overlapped with the grating region 53 of the another diffractive optical element 32. It can increase diffraction effect.

In embodiments, the diffractive optical element is adjusted according to condition and effect for the display device.

Referring to FIG. 32, in embodiments, the display device 410 is a liquid crystal display device such as a vertical aligned/multi-domain vertical aligned liquid crystal display device. The display device 410 comprises a backlight module 411, a liquid crystal panel 427, the polarizer 415 and the polarizer 425. The liquid crystal panel 427 is disposed on the backlight module 411. For example, the liquid crystal panel 427 comprises a thin film transistor substrate 416, a liquid crystal layer 418 and a color filter substrate 421. The thin film transistor substrate 416 and the color filter substrate 421 may have an electrode layer 417 and an electrode layer 419 respectively. In some embodiments, alignment films (not shown) may be disposed on the electrode layer 417 and the electrode layer 419. The liquid crystal layer 418 is disposed between the thin film transistor substrate 416 and the color filter substrate 421. The polarizer 415 may be disposed between the thin film transistor substrate 416 and the backlight module 411 (on the light entering side of the liquid crystal panel 427). The polarizer 425 may be disposed on the color filter substrate 421 (the light emitting side of the liquid crystal panel 427). The diffractive optical element 402 may be disposed on the light emitting side of the polarizer 425. In other embodiments (not shown), the diffractive optical element 402 may be disposed on the color filter substrate 421 or between the color filter substrate 421 and the polarizer 425. The diffractive optical element 402 is disposed by placing the wave crest structure facing the polarizer 425 or opposite to the polarizer 425. The diffractive optical element 425 may further stack with other elements having different functions, such as an anti-reflection film, a scratch-resistant film, etc.

The direction of the liquid crystal molecules 428 of the liquid crystal layer 418 may be changed by changing a condition of the electrical field in the liquid crystal layer 418. In embodiments, as no electrical field is applied in the liquid crystal layer 418, for example, voltages applied to the electrode layer 417 and the electrode layer 419 (FIG. 32) are both zero, the liquid crystal molecules 428 are substantially perpendicular to the surface of the thin film transistor substrate 416 and the surface of the color filter substrate 421, as indicated by the cross-section view of FIG. 33A-1 and the top view of FIG. 33A-2. As an electrical field is applied in the liquid crystal layer 418, for example by applying different voltages to the electrode layer 417 and the electrode layer 419 respectively, the liquid crystal molecules 428 is tilted into a liquid crystal tilt direction to have a liquid crystal azimuth angle due to the electrical field. The liquid crystal molecules have a liquid crystal tilt angle relative to the electrode layer. In another embodiment, as no electrical field is applied, the liquid crystal molecules 428 adjacent to the thin film transistor substrate 416 may have a pretilt angle PA bigger than or equal to 60 degrees and included with the surface of the thin film transistor substrate 416, and the liquid crystal molecules 428 far from the thin film transistor substrate 416 tend to be more perpendicular to the thin film transistor substrate 416 and the color filter substrate 421 gradually, as show in the cross-section view of FIG. 33B-1 and the top view of FIG. 33B-2. In yet another embodiment (not shown), the liquid crystal molecules 428 adjacent to the color filter substrate 421 may have a pretilt angle bigger than or equal to 60 degrees and included with the surface of the color filter substrate 421, and the liquid crystal molecules 428 far from the color filter substrate 421 tend to be more perpendicular to the thin film transistor substrate 416 and the color filter substrate 421 gradually. In yet another embodiment (not shown), the liquid crystal molecules 428 adjacent to the thin film transistor substrate 416 and the color filter substrate 421 may have pretilt angles bigger than or equal to 60 degrees and included with the surface of the thin film transistor substrate 416 and the surface of the color filter substrate 421 respectively. In a case of the liquid crystal molecules 428 having the pretilt angle, as an electrical field is applied in the liquid crystal layer 418, for example by applying an electric potential by applying different voltages to the electrode layer 417 and the electrode layer 419 respectively, the liquid crystal molecules 428 are tilted to liquid crystal tilt direction and to have a liquid crystal azimuth angle and a liquid crystal tilt angle relative to the electrode layer more rapidly due to effect from the electrical field and the pretilt direction. In one embodiment, the absorbing axis of the polarizer on the color filter substrate 421 is used as the X axis for defining the azimuth angle, and the azimuth angle of the liquid crystal tilt direction relative to the substrate such as the color filter substrate 421 is defined as the liquid crystal azimuth angle Q, as shown in FIG. 34A. In other words, the liquid crystal azimuth angle Q is an included angle between the X axis and the projection direction onto the surface of the substrate such as the color filter substrate 421 from the head ends of the liquid crystal molecules 428. For example, as the display device 410 is a single-domain vertical aligned liquid crystal display device, only one kind of the liquid crystal azimuth angle Q is generated, and an included angle between the single kind of the liquid crystal tilt direction and the absorbing axis of the polarizer on the light emitting side is 45 degrees. For example, the symmetrical liquid crystal azimuth angle is 45 degrees, 135 degrees, 225 degrees or 315 degrees. As the display device 410 is a two-domain vertical aligned liquid crystal display device, it is comprehended that two kinds of the liquid crystal azimuth angles Q would be generated at the same time, included angles between the two kinds of the liquid crystal tilt directions and the absorbing axis of the polarizer on the light emitting side are both 45 degrees. For example, the symmetrical liquid crystal azimuth angles are 45 degrees and 135 degrees, or 225 degrees and the 315 degrees. Otherwise, the symmetrical liquid crystal azimuth angles are 45 degrees and 225 degrees, or 135 degrees and 315 degrees. As the display device 410 is a multi-domain vertical aligned liquid crystal display device, it is comprehended that various kinds of the liquid crystal azimuth angles Q would be generated at the same time. For example, the symmetrical liquid crystal azimuth angles are 45 degrees, 135 degrees, 225 degrees and 315 degrees as shown in the cross-section view of FIG. 34B-1 and the top view of FIG. 34B-2, or other liquid crystal azimuth angles. In addition, the multi-domain vertical aligned liquid crystal display device may comprise a low color shift, usually using the technique of eight-domain vertical aligned liquid crystal display in which as some voltage is applied to the device, the liquid crystal tilt angles in one group of four domains having the liquid crystal azimuth angles of 45 degrees, 135 degrees, 225 degrees and 315 degrees are different from the liquid crystal tilt angles in another group of four domains also having the liquid crystal azimuth angles of 45 degrees, 135 degrees, 225 degrees and 315 degrees.

In some embodiments, the diffractive optical element is designed according the liquid crystal molecules 428 of the display device 410 (FIG. 33A, 33B).

In some embodiments, the diffractive optical element is designed according to the alignment film of the display device 410.

Figure 35:
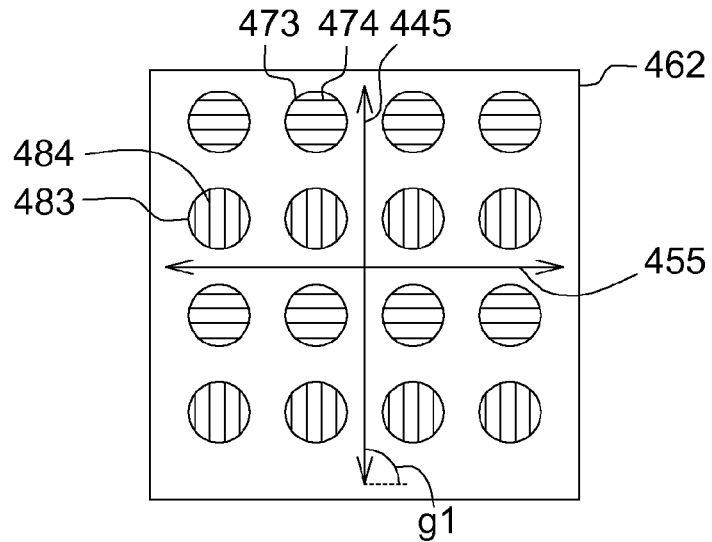
FIGS. 35-43, 49-51 and 57-59 illustrate relations between of the polarizing direction of the polarizer and the diffractive optical element.

In some embodiments, the diffractive optical element is designed according to the arrangement of the polarizer. Referring to FIG. 35, in embodiments, the azimuth angle of the system is defined using the absorbing axis of the polarizer on the light emitting side as a standard. Therefore, the azimuth angle g1 of the polarizing direction 445 of the polarizer on the light emitting side, i.e. the upper polarizer, is 90 degrees, that is, the azimuth angle of the transmission axis of the polarizer is 90 degrees and the azimuth angle of the absorbing axis of the polarizer is 0 degree (parallel to the X axis). The azimuth angle of the polarizing direction 455 of the polarizer adjacent to the backlight module, i.e. the lower polarizer, is 0 degree, that is the azimuth angle of the transmission axis of the polarizer is 0 degree and the azimuth angle of the absorbing axis of the polarizer is 90 degrees (perpendicular to the X axis). The diffractive optical element 462, similar to the diffractive optical element 32 in FIG. 2, has the grating region 473 and the grating region 483, respectively having the diffraction grating 474 having the grating direction having the azimuth angle of 0 degree and the diffraction grating 484 having the grating direction having the azimuth angle of 90 degrees. The density of the diffraction grating 483 is bigger than or equal to the density of the diffraction grating 473. In this case, the azimuth angle of the long axis direction of the row constituted by the grating regions 473 and the azimuth angle of the long axis direction of the row constituted by the grating regions 483 are 0 degree. The azimuth angle of the long axis direction of the column constituted by the grating regions 473 and the grating region 483 arranged in alternation is 90 degrees.

Figure 36:
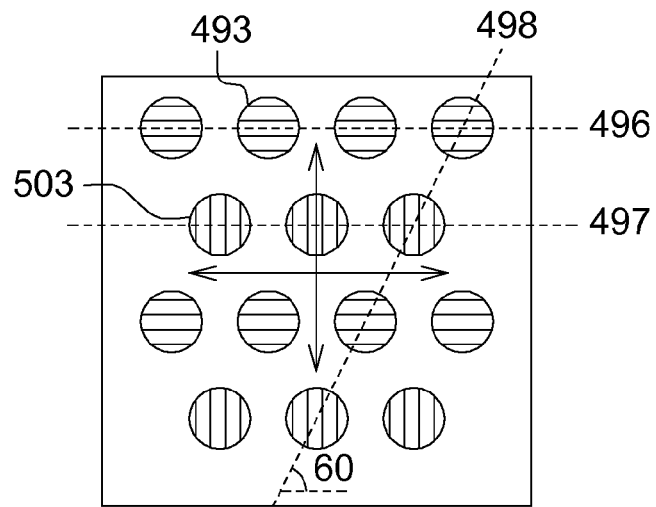
Figure 37:
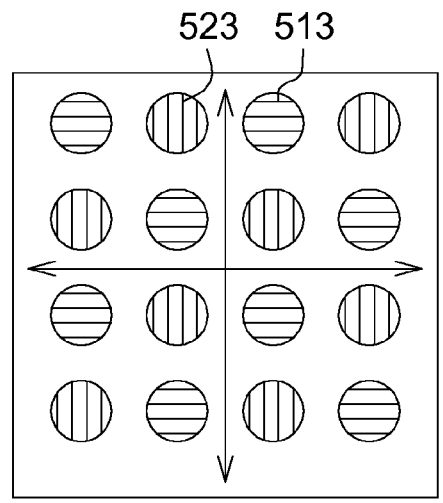

The embodiment as shown in FIG. 36 is different from the embodiment as shown in FIG. 35 in that the grating regions 493, similar with the grating region 473 in FIG. 35, and the grating region 503, similar with the grating region 483 in FIG. 35 are arranged in alternation. In this case, the azimuth angle of the long axis direction 496 of the row constituted by the grating regions 493 and the azimuth angle of the long axis direction 497 of the row constituted by the grating regions 503 are 0 degree. The azimuth angle of the long axis direction of the column constituted by the grating regions 493 and the grating region 503 arranged in alternation is 60 degrees. The embodiment as shown in FIG. 37 is different from the embodiment as shown in FIG. 35 in that the grating regions 513, similar with the grating region 473 in FIG. 35, and the grating region 523, similar with the grating region 483 in FIG. 35 are arranged in alternation. In this case, the azimuth angle of the long axis direction of the row consti-tuted by the grating regions 513 and the grating regions 523 arranged in alternation is 0 degree. The azimuth angle of the long axis direction of the column constituted by the grating regions 513 and the grating regions 523 arranged in alternation is 90 degrees.

Figure 38:
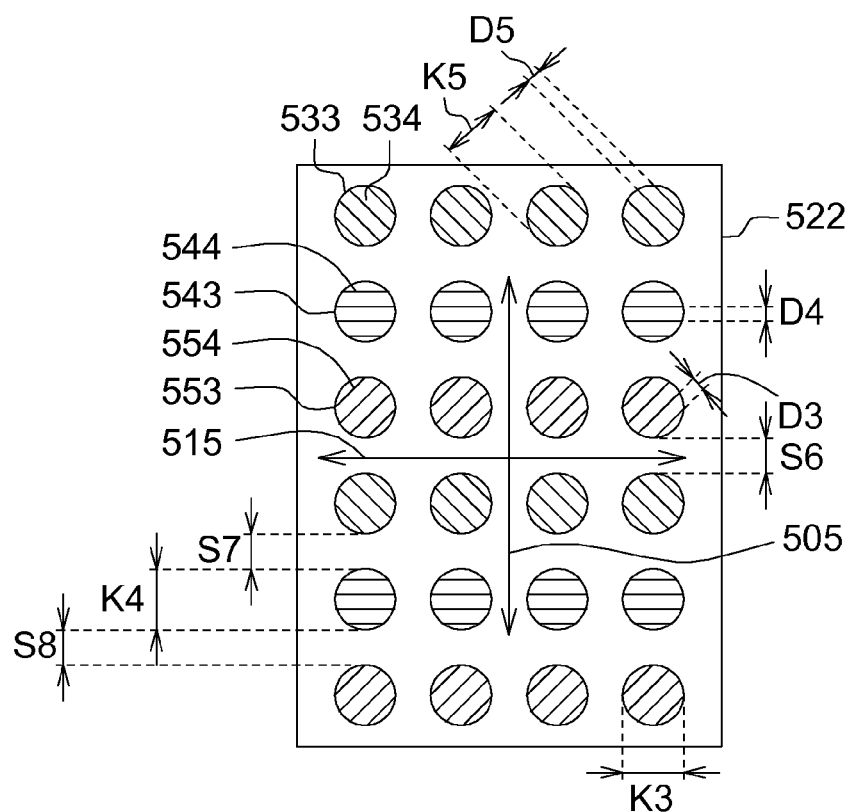

Referring to FIG. 38, the azimuth angle of the polarizing direction 505 of the polarizer, such as the polarizer 425 in FIG. 32, on the light emitting side is 90 degrees, that is the azimuth angle of the transmission axis of the polarizer 425 is 90 degrees, or the azimuth angle of the absorption axis of the polarizer 425 is 0 degree. The azimuth angle of the polarizing direction 515 of the polarizer, such as the polarizer 415 in FIG. 32, adjacent to the backlight module is 0 degree, that is the azimuth angle of the transmission axis of the polarizer 455 is 0 degree, or the azimuth angle of the absorption axis of the polarizer 455 is 90 degrees. The diffractive optical element 522, similar with the diffractive optical element 82 in FIG. 4, has the grating region 533, the grating region 543 and the grating region 553, for example, respectively having the diffraction grating 534 having the grating direction having the azimuth angle of 135 degrees, the diffraction grating 544 having the grating direction having the azimuth angle of 0 degree, and the diffraction grating 554 having the grating direction having the azimuth angle of 45 degrees.

Figure 39:
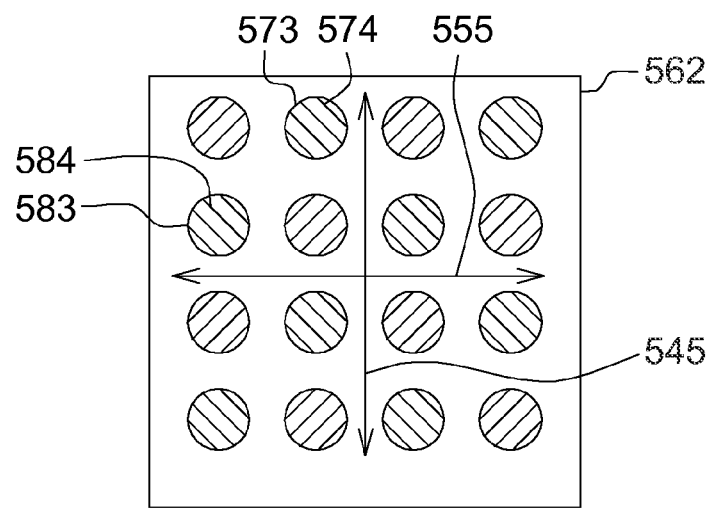

Referring to FIG. 39, the azimuth angle of the polarizing direction 545 of the polarizer, such as the polarizer 425 in FIG. 32, on the light emitting side is 90 degrees, that is the azimuth angle of the transmission axis of the polarizer is 90 degrees, or the azimuth angle of the absorption axis of the polarizer is 0 degree. The azimuth angle of the polarizing direction 555 of the polarizer, such as the polarizer 415 in FIG. 32, adjacent to the backlight module is 0 degree, that is the azimuth angle of the transmission axis of the polarizer is 0 degree, or the azimuth angle of the absorption axis of the polarizer is 90 degrees. The diffractive optical element 562, similar with the diffractive optical element 182 in FIG. 7, has the grating region 573 and the grating region 583, respectively having the diffraction grating 574 having the grating direction having the azimuth angle of 135 degrees and the diffraction grating 584 having the grating direction having the azimuth angle of 45 degrees.

Figure 40:
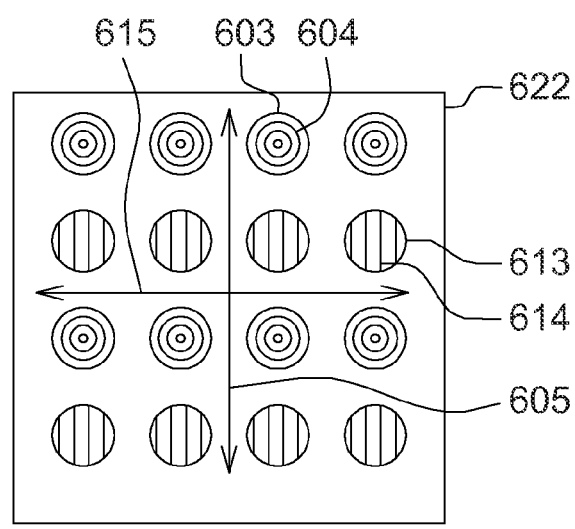

Referring to FIG. 40, the azimuth angle of the polarizing direction 605 of the polarizer, such as the polarizer 425 in FIG. 32, on the light emitting side is 90 degrees. The azimuth angle of the polarizing direction 615 of the polarizer, such as the polarizer 415 in FIG. 32, adjacent to the backlight module is 0 degree. The diffractive optical element 622 for using is similar with the diffractive optical element 292 in FIG. 40, and has the grating region 603 and the grating region 613, respectively having the diffraction grating 604 having various grating directions and the diffraction grating 614 having the grating direction having the azimuth angle of 90 degrees.

<First Experimental Example>

The experiment uses the Konica Minolta CS-2000 to measure the V260B3-LE1 type liquid crystal display device (manufactured by CHIMEI INNOLUX CORPORATION) incorporated with the diffractive optical element 212 (T=124 μm, W=117 μm, N=1 μm, M=7 μm) as shown in FIG. 17, and in which the azimuth angle of the polarizing direction of the polarizer (the upper polarizer) on the (light emitting side) is 90 degrees, and the azimuth angle of the polarizing direction of the polarizer (the lower polarizer) adjacent to the backlight module is 0 degree. The white state and the black state of the liquid crystal display device are measured for every 5 degrees of counter-clockwise rotating of the diffractive optical element 212. In addition, the contrast value (white state (255 gray level) brightness/black state (0 gray level) brightness) and the normalization brightness of each gray level (brightness of each gray level/white state (255 gray level) brightness) are calculated. Data are shown in table 1. From the results shown in table 1, it is found that the display device has the higher contrast values (higher than 70%) as the azimuth angle of the diffraction grating 224 is in a range between 0±15 degrees, or in a range between 90±10 degrees.

TABLE 1

| azimuth angle of diffraction grating | Central contrast |
|---|---|
| −85 | 2036.06 |
| −80 | 1669.96 |
| −75 | 1363.75 |
| −70 | 1121.63 |
| −65 | 988.787 |
| −60 | 901.776 |
| −55 | 883.481 |
| −50 | 867.445 |
| −45 | 897.603 |
| −40 | 1013.12 |
| −35 | 1091.08 |
| −30 | 1202.22 |
| −25 | 1302.89 |
| −20 | 1527.62 |
| −15 | 1954.99 |
| −10 | 2224.36 |
| −5 | 2386.65 |
| 0 | 2387 |
| 5 | 2375.07 |
| 10 | 2213.66 |
| 15 | 1942.91 |
| 20 | 1536.5 |
| 25 | 1306.8 |
| 30 | 1193.08 |
| 35 | 1090.86 |
| 40 | 1001.26 |
| 45 | 898.504 |
| 50 | 863.88 |
| 55 | 888.454 |
| 60 | 910.851 |
| 65 | 993.333 |
| 70 | 1120.93 |
| 75 | 1361.88 |
| 80 | 1681.92 |
| 85 | 2027.31 |
| 90 | 2365.39 |

A measuring method for the characteristics is adjusting the angle of the diffraction grating, and measuring the difference between the normalization brightness of the display device at the zenith angle of 0° and the brightness of the display device at the zenith angles of 45° or 60° at specific gray levels to obtain a normalization brightness difference. The display device without using the diffractive optical element is one comparative example.

The test results show that at the observation angle $\psi=0$ degree, the greatest difference value (15.66%) between the normalization brightness at the zenith angle $\theta=45$ degrees and the normalization brightness at the zenith angle $\theta=0$ degree of comparative example is at the 112 gray level. Therefore, this test takes 112 gray level as an observation standard for the condition of $(\theta,\psi)=(45,0)$. The difference value between the normalization brightness of the display device with the diffractive optical element 212 in embodiments is smaller than that in comparative examples. In embodiments, the azimuth angle of the diffraction grating 224 may be in a range of −90~−30 degrees in which the normalization brightness values are all improved, or in a range of −90~−70 degrees in which a variation degree of the optimum values of the normalization brightness difference at $\theta$ of 45° and 0° is under 10%. Table 1 shows the symmetrical characteristic of the diffractive optical element 212, indicating that the azimuth angle of the diffraction grating 224 can be in a range between −90±60 degrees, or in a range between −90±20 degrees. In detail, for example, from the results in table 2A, it is found that the difference value between the normalization brightness values of 112 gray level at $\theta=45$ degrees and $\theta=0$ degree becomes bigger as the azimuth angle of the diffraction grating 224 of the diffractive optical element 212 is more diverged from −90 degrees. As the divergence is about −30 degrees, the difference value has the biggest value (14.20%), but still smaller than the difference value of comparative example (15.66%).

The test results also show that at observation angle $\psi=0$ degree, the greatest difference value (26.33%) between the normalization brightness at the zenith angle $\theta=60$ degrees and the normalization brightness at the zenith angle $\theta=0$ degree of comparative example is at the 104 gray level. Therefore, this test takes 104 gray level as an observation standard for the condition of $(\theta,\psi)=(60,0)$. The difference value between the normalization brightness values of the display device with the diffractive optical element 212 in embodiments is smaller than that in comparative examples. In embodiments, the azimuth angle of the diffraction grating 224 may be in a range of −90~−30 degrees in which the normalization brightness difference is still acceptable, or in a range of −90~−70 degrees in which the normalization brightness difference is within a tolerance value. Table 1 shows the symmetrical characteristic of the diffractive optical element 212, indicating that the azimuth angle of the diffraction grating 224 can be in a range between −90±60 degrees, or in a range between −90±20 degrees. In detail, for example, from the results in table 2A, it is found that the difference value between the normalization brightness values of 104 gray level at $\theta=45$, 60 degrees and $\theta=0$ degree becomes bigger as the azimuth angle of the diffraction grating 224 of the diffractive optical element 212 is more diverged from −90 degrees. As the divergence is about −30 degrees, the difference value has the biggest value (24.51%), but still smaller than the difference value (26.33%) of comparative example.

In table 2A, the normalization difference is the normalization brightness difference between the conditions having the diffraction grating having the azimuth angle of −90 degrees as a standard and the diffraction grating having the azimuth angle of other rotating angles.

TABLE 2A

| | ($\psi$ = 0 degree) | | | |
|---|---|---|---|---|
| azimuth angle of diffraction grating | Normalization brightness difference between $\theta$ of 45° and 0° (gray level 112) | normalization difference at $\theta$ of 45° | Normalization brightness difference between $\theta$ of 60° and 0° (gray level 104) | normalization difference at $\theta$ of 60° |
| comparative example | 15.66% | — | 26.33% | — |
| −90 | 10.30% | 100.00% | 15.65% | 100.00% |
| −80 | 10.36% | 100.58% | 15.90% | 101.57% |
| −70 | 10.60% | 102.93% | 16.32% | 104.24% |

TABLE 2A-continued ($\psi$ = 0 degree)

| azimuth angle of diffraction grating | Normalization brightness difference between θ of 45° and 0° (gray level 112) | normalization difference at θ of 45° | Normalization brightness difference between θ of 60° and 0° (gray level 104) | normalization difference at θ of 60° |
|---|---|---|---|---|
| −60 | 11.50% | 111.70% | 17.97% | 114.81% |
| −50 | 12.92% | 125.52% | 21.71% | 138.71% |
| −40 | 13.44% | 130.54% | 22.85% | 145.96% |
| −30 | 14.20% | 137.89% | 24.51% | 156.60% |

At the observation angle $\psi$=45 degrees, the greatest difference value (15.27%) between the normalization brightness at the zenith angle θ=45 degrees and the normalization brightness at the zenith angle θ=0 degree of comparative example is at the 128 gray level. Therefore, this test takes 128 gray level as an observation standard for the condition of (θ,$\psi$)=(45,45). The difference value between the normalization brightness values of the display device with the diffractive optical element 212 in embodiments is smaller than that in comparative examples. In embodiments, the azimuth angle of the diffraction grating 224 may be in a range of −90~−30 degrees or in a range of −80~−40 degrees in which the normalization brightness difference is within a tolerance value. In detail, for example, from the results in table 2B, it is found that the difference value between the normalization brightness values of 128 gray level at θ=45 degrees and θ=0 degree becomes bigger as the azimuth angle of the diffraction grating 224 of the diffractive optical element 212 is more diverged from −50 degrees. As the divergence is about −90 degrees, the difference value has the biggest value (10.98%), smaller than the difference value (15.27%) of comparative example.

The test results also show that at the observation angle $\psi$=45 degrees, the greatest difference value (25.50%) between the normalization brightness at the zenith angle θ=60 degrees and the normalization brightness at the zenith angle θ=0 degree of comparative example is at the 136 gray level. Therefore, this test takes 136 gray level as an observation standard for the condition of (θ,$\psi$)=(60,45). The difference value between the normalization brightness values of the display device with the diffractive optical element 212 in embodiments is smaller than that in comparative examples. In embodiments, the azimuth angle of the diffraction grating 224 may be in a range of −90~−30 degrees in which the normalization brightness values are all improved, or in a range of −60~−40 degrees in which a variation degree of the optimum values of the normalization brightness difference at θ of 45° and 0° is under 10%. Since Table 1 shows the symmetrical characteristic of the diffractive optical element 212, the azimuth angle of the diffraction grating 224 can be in a range between −90±60 degrees, in a range between −60~−40 degrees, or in a range between 40~60 degrees. In detail, for example, from the results in table 2B, it is found that the difference value between the normalization brightness values of 136 gray level at θ=60 degrees and θ=0 degree becomes bigger as the azimuth angle of the diffraction grating 224 of the diffractive optical element 212 is more diverged from −50 degrees. As the divergence is about −90 degrees, the difference value has the biggest value (18.42%), smaller than the difference value (25.50%) of comparative example.

In table 2B, the normalization difference is the normalization brightness difference between the conditions having the diffraction grating having the azimuth angle of 0 degree as a standard and the diffraction grating having the azimuth angle of other rotating.

TABLE 2B ($\psi$ = 45 degrees)

| azimuth angle of diffraction grating | Normalization brightness difference between θ of 45° and 0° (gray level 128) | normalization difference at θ of 45° | Normalization brightness difference between θ of 60° and 0° (gray level 136) | normalization difference at θ of 60° |
|---|---|---|---|---|
| comparative example | 15.27% | — | 25.50% | — |
| −90 | 10.98% | 100% | 18.42% | 100% |
| −80 | 9.92% | 90.34% | 16.56% | 89.9% |
| −70 | 9.61 | 87.55% | 14.60% | 79.25% |
| −60 | 9.43 | 85.91% | 13.84% | 75.12% |
| −50 | 9.11 | 82.99% | 13.05% | 70.84% |
| −40 | 9.93 | 90.45% | 14.07% | 76.4% |
| −30 | 10.26% | 93.45% | 15.39% | 83.54% |

<Second Experimental Example>

The experiment uses the Konica Minolta CS-2000 to measure the V260B3-LE1 multi-domain vertical aligned type liquid crystal display device (the pixel of which is 1366*768,60 PPI, the long side of the pixel is 421 μm) incorporated with the diffractive optical element 462 (in one embodiment S1=9 μm, S2=15 μm, S4=S5=13 μm, D1=D2=1 μm, K1=K2=28 μm, referring to FIG. 2, in other embodiments S1=9 μm, S2=15 μm, S3=9 μm, D1=D2=1 μm, S4=S5=41 μm, K1=K2=28 μm) as shown in FIG. 35, and in which the azimuth angle of the polarizing direction of the polarizer (the upper polarizer) on the light emitting side is 90 degrees, and the azimuth angle of the polarizing direction of the polarizer (the lower polarizer) adjacent to the backlight module is 0 degree. The white state and the black state of the liquid crystal display device are measured for every 5 degrees of counter-clockwise rotating of the diffractive optical element 462. In addition, the contrast value (white state (255 gray level) brightness/black state (0 gray level) brightness) and the normalization brightness of each gray level (brightness of each gray level/white state (255 gray level) brightness) are calculated. Effects of adjusting the angle of the diffraction grating to the contrast results are shown in table 3.

TABLE 3

| azimuth angle of diffraction grating 474 | Central contrast |
|---|---|
| −85 | 2653.63 |
| −80 | 2275.96 |
| −75 | 1927.98 |
| −70 | 1879.63 |
| −65 | 1672.25 |
| −60 | 1582.49 |
| −55 | 1508.89 |
| −50 | 1416.34 |
| −45 | 1389.98 |
| −40 | 1408.87 |
| −35 | 1455.02 |
| −30 | 1541.79 |
| −25 | 1721.54 |
| −20 | 1906.83 |

TABLE 3-continued

| azimuth angle of diffraction grating 474 | Central contrast |
|---|---|
| −15 | 2213.4 |
| −10 | 2449.05 |
| −5 | 2736.44 |
| 0 | 2874.65 |
| 5 | 2745.95 |
| 10 | 2458.79 |
| 15 | 2214.45 |
| 20 | 1915.55 |
| 25 | 1715.48 |
| 30 | 1552.6 |
| 35 | 1457.98 |
| 40 | 1406.88 |
| 45 | 1398.19 |
| 50 | 1421.03 |
| 55 | 1487.78 |
| 60 | 1587.25 |
| 65 | 1682.31 |
| 70 | 1879.84 |
| 75 | 2010.5 |
| 80 | 2269.47 |
| 85 | 2565.52 |
| 90 | 2807.26 |

In table 3, 0 degree indicates that the azimuth angle of the diffraction grating 474 of the grating region 473 is 0 degree, and the azimuth angle of the diffraction grating 484 of the grating region 483 is 90 degrees, as shown in the arrangement condition in FIG. 35. In table 3, +5 degrees indicates that the azimuth angle of the diffraction grating 474 of the grating region 473 is +5 degree, and the azimuth angle of the diffraction grating 484 of the grating region 483 is +95 degrees. The azimuth angle of the polarizing direction of the polarizer on the light emitting side is fixed at 90 degrees. From the results shown in table 3, it is found that the display device has the higher contrast values (higher than 70%) as the azimuth angle of the diffraction grating 474 is in a range between 0±15 degrees, or in a range between 90±10 degrees. A measuring method for the characteristics is adjusting the angle of the diffraction grating, and measuring the difference between the normalization brightness of the display device at the zenith angle of 0° and the brightness of the display device at the zenith angles of 45° or 60° to obtain a normalization brightness difference. The display device without using the diffractive optical element is one comparative example.

The test results show that at the observation angle ψ=0 degree, the greatest difference value (15.66%) between the normalization brightness at the zenith angle θ=45 degrees and the normalization brightness at the zenith angle θ=0 degree of comparative example is at the 112 gray level. Therefore, this test takes 112 gray level as an observation standard for the condition of (θ,ψ)=(45,0). The difference value between the normalization brightness of the display device with the diffractive optical element 462 in embodiments is smaller than that in comparative examples. In embodiments, the azimuth angle of the diffraction grating 474 may be in a range of 0~105 degrees. In detail, for example, from the results in table 4A, it is found that the display device has the smallest difference value between the normalization brightness values of 112 gray level at θ=45 degrees and θ=0 degree as the azimuth angle of the diffraction grating 474 of the diffractive optical element 462 is set at 20 degrees. The biggest difference value (14.36%) is obtained as the azimuth angle of the diffraction grating 474 is set at 40 degrees in embodiments, still smaller than the difference value of comparative example (15.66%).

The test results also show that at observation angle ψ=0, the greatest difference value (26.33%) between the normalization brightness at the zenith angle θ=60 degrees and the normalization brightness at the zenith angle θ=0 degree of comparative example is at the 104 gray level. Therefore, this test 104 gray level as an observation standard for the condition of (θ,ψ)=(60,0). The difference value between the normalization brightness values of the display device with the diffractive optical element 462 in embodiments is smaller than that in comparative examples. In embodiments, the azimuth angle of the diffraction grating 474 may be in a range of 0~105 degrees in which the normalization brightness values are all improved, or in a range of 0~60 degrees in which the normalization brightness values are all improved. In detail, for example, from the results in table 4A, it is found that the difference value between the normalization brightness values of 104 gray level at θ=45, 60 degrees and θ=0 degree becomes bigger as the azimuth angle of the diffraction grating 474 of the diffractive optical element 462 is more diverged from 0 degree. As the divergence is about 60 degrees, the difference value has the biggest value (22.93%), still smaller than the difference value of comparative example (26.33%). Comparing the results in table 2A and table 4A founds that the effect of rotating the diffractive optical element 474 is weaker than that of rotating the diffractive optical element 212.

TABLE 4A

| | (ψ = 0 degree) | | | |
|---|---|---|---|---|
| azimuth angle of diffraction grating 474 | Normalization brightness difference between θ of 45° and 0° (gray level 112) | normalization difference at θ of 45° | Normalization brightness difference between θ of 60° and 0° (gray level 104) | normalization difference at θ of 60° |
| comparative example | 15.66% | — | 26.33% | — |
| 0 | 13.79% | 100.00% | 20.57% | 100.00% |
| 10 | 14.02% | 101.72% | 20.94% | 101.78% |
| 20 | 13.62% | 98.79% | 21.15% | 102.82% |
| 30 | 13.93% | 101.02% | 21.41% | 104.09% |
| 40 | 14.36% | 104.16% | 22.35% | 108.67% |
| 45 | 13.83% | 100.34% | 22.39% | 108.83% |
| 50 | 13.88% | 100.65% | 22.72% | 110.45% |
| 60 | 14.00% | 101.52% | 22.93% | 111.45% |
| 70 | 14.11% | 102.32% | 22.35% | 108.65% |
| 80 | 14.04% | 101.81% | 22.52% | 109.47% |
| 90 | 13.91% | 100.87% | 21.27% | 103.4% |
| 100 | 14.05% | 101.88% | 20.78% | 101.02% |
| 105 | 14.04% | 101.81% | 21.45% | 104.27% |

At the observation angle ψ=45 degrees, the greatest difference value (15.27%) between the normalization brightness at the zenith angle θ=45 degrees and the normalization brightness at the zenith angle θ=0 degree of comparative example is at the 128 gray level. Therefore, this test takes 128 gray level as an observation standard for the condition of (θ,ψ)=(45,45). The difference value between the normalization brightness values of the display device with the diffractive optical element 462 in embodiments is smaller than that in comparative examples. In embodiments, the azimuth angle of the diffraction grating 474 may be in a range of 0~105 degrees in which the normalization brightness values are all improved, or in a range of 20~60 degrees in which the normalization brightness values are all improved. In detail, for example, from the results in table 4B, it is found that the difference value between the normalization brightness values of 128 gray level at θ=45 degrees and θ=0 degree becomes bigger as the azimuth angle of the diffraction grating 474 of the diffractive optical element 462 is more diverged from 0 degree. As the divergence is about 70 degrees, the difference value has the biggest value (14.61%), still smaller than the difference value of comparative example (15.27%). The difference value becomes smaller gradually as the azimuth angle is more diverged from 70 degrees until the azimuth angle reaches 90 degrees. The difference value becomes bigger gradually as the azimuth angle is more diverged from 90 degrees.

The test results also show that at observation angle ψ=45 degrees, the greatest difference value (25.50%) between the normalization brightness at the zenith angle θ=60 degrees and the normalization brightness at the zenith angle θ=0 degree of comparative example is at the 136 gray level. Therefore, this test takes 136 gray level as an observation standard for the condition of (θ,ψ)=(60,45). The difference value between the normalization brightness values of the display device with the diffractive optical element 462 in embodiments is smaller than that in comparative examples. In embodiments, the azimuth angle of the diffraction grating 474 may be in a range of 0~105 degrees or in a range of 20~60 degrees. In detail, for example, from the results in table 4B, it is found that the difference value between the normalization brightness values of 136 gray level at θ=45, 60 degrees and θ=0 degree becomes bigger as the azimuth angle of the diffraction grating 474 of the diffractive optical element 462 is more diverged from 50 degrees. As the divergence is about 105 degrees, the difference value has the biggest value (23.77%), still smaller than the difference value of comparative example (25.50%).

Comparing the results in table 4B and table 2B founds that the influence of rotating the diffractive optical element 462 is smaller than that of rotating the diffractive optical element 212.

TABLE 4B (ψ = 45 degrees)

| azimuth angle of diffraction grating 474 | Normalization brightness difference between θ of 45° and 0° (gray level 128) | normalization difference at θ of 45° | Normalization brightness difference between θ of 60° and 0° (gray level 136) | normalization difference at θ of 60° |
|---|---|---|---|---|
| comparative example | 15.27% | — | 25.5% | — |
| 0 | 12.60% | 100.00% | 20.23% | 100.00% |
| 10 | 13.62% | 108.07% | 22.93% | 113.34% |
| 20 | 13.05% | 103.52% | 20.86% | 103.08% |
| 30 | 12.63% | 100.18% | 20.85% | 103.03% |
| 40 | 13.14% | 104.27% | 19.62% | 96.96% |
| 45 | 13.28% | 105.37% | 19.68% | 97.27% |
| 50 | 13.67% | 108.48% | 19.07% | 94.27% |
| 60 | 14.35% | 113.88% | 19.81% | 97.91% |
| 70 | 14.61% | 115.95% | 20.67% | 102.17% |
| 80 | 13.89% | 110.23% | 21.18% | 104.69% |
| 90 | 13.52% | 107.3% | 21.65% | 107.01% |
| 100 | 13.97% | 110.87% | 22.19% | 109.68% |
| 105 | 14.43% | 114.52% | 23.77% | 117.49% |

<Third Experimental Example>

The experiment uses the Konica Minolta CS-2000 to measure the V260B3-LE1 multi-domain vertical aligned type liquid crystal display device incorporated with the diffractive optical element 522 (S6=1 μm, S7=1 μm, S8=1 μm, D3=D4=D5=1 μm, S9=S10=S11=1 μm, K3=K4=K5=28 μm) as shown in FIG. 38, and of which the azimuth angle of the polarizing direction of the polarizer (the upper polarizer) on the light emitting side is 90 degrees, and the azimuth angle of the polarizing direction of the polarizer (the lower polarizer) adjacent to the backlight module is 0 degree. The white state and the black state of the liquid crystal display device are measured for every 5 degrees of counter-clockwise rotating of the diffractive optical element 522. In addition, the contrast value (white state (255 gray level) brightness/black state (0 gray level) brightness) and the normalization brightness of each gray level (brightness of each gray level/white state (255 gray level) brightness) are calculated. The experimental results are shown in table 5. In table 5, 0 degree indicates that the azimuth angle of the diffraction grating 534 of the grating region 533 is 135 degrees (able to be regard as −45 degrees), the azimuth angle of the diffraction grating 544 of the grating region 543 is 0 degree, and the azimuth angle of the diffraction grating 554 of the grating region 553 is 45 (+45) degrees. +5 degrees indicates that the azimuth angle of the diffraction grating 534 of the grating region 533 is 140 degrees, the azimuth angle of the diffraction grating 544 of the grating region 543 is 5 degrees, and the azimuth angle of the diffraction grating 554 of the grating region 553 is 50 degrees. The rest can be deduced by analogy. The azimuth angle of the polarizing direction 505 of the polarizer on the light emitting side is fixed at 90 degrees. From the results shown in table 5, it is found that the display device has the higher contrast values as the azimuth angle of the diffraction grating 544 is in a range between 45±90 degrees, preferably in a range between 45±15 degrees, or in a range between −45±90 degrees, preferably in a range between −45±10 degrees.

TABLE 5

| azimuth angle of diffraction grating 544 | Central contrast |
|---|---|
| −85 | 738.2421 |
| −80 | 752.2627 |
| −75 | 766.3064 |
| −70 | 794.7366 |
| −65 | 820.2245 |
| −60 | 859.1368 |
| −55 | 886.9945 |
| −50 | 919.2953 |
| −45 | 930.3117 |
| −40 | 926.0811 |
| −35 | 881.7187 |
| −30 | 844.9017 |
| −25 | 795.7842 |
| −20 | 758.2301 |
| −15 | 716.3835 |
| −10 | 692.7616 |
| −5 | 681.3729 |
| 0 | 683.8843 |
| 5 | 680.8817 |
| 10 | 692.7406 |
| 15 | 737.8889 |
| 20 | 754.3182 |
| 25 | 815.0332 |
| 30 | 842.9949 |
| 35 | 881.5935 |
| 40 | 926.1159 |
| 45 | 939.548 |
| 50 | 919.6185 |
| 55 | 887.0896 |
| 60 | 880.1491 |

TABLE 5-continued

| azimuth angle of diffraction grating 544 | Central contrast |
|---|---|
| 65 | 819.8475 |
| 70 | 793.929 |
| 75 | 763.1694 |
| 80 | 751.1818 |
| 85 | 737.3529 |
| 90 | 729.1562 |

A measuring method for the characteristics is adjusting the angle of the diffraction grating, and measuring the difference between the normalization brightness of the display device at the zenith angle of 0° and the brightness of the display device at the zenith angles of 45° or 60° at specific gray levels to obtain a normalization brightness difference. The display device without using the diffractive optical element is one comparative example.

The test results show that at the observation angle $\psi=0$ degree, the greatest difference value (15.66%) between the normalization brightness at the zenith angle $\theta=45$ degrees and the normalization brightness at the zenith angle $\theta=0$ degree of comparative example is at the 112 gray level. Therefore, this test takes 112 gray level as an observation standard for the condition of $(\theta,\psi)=(45,0)$. The difference value between the normalization brightness of the display device with the diffractive optical element 212 in embodiments is smaller than that in comparative examples. The difference value between the normalization brightness of the display device with the diffractive optical element 522 in embodiments is smaller than that in comparative examples. In embodiments, the azimuth angle of the diffraction grating 522 may be in a range of −90~−30 degrees in which the normalization brightness difference is still acceptable, or in a range of −90~−70 degrees in which a variation degree of the optimum values of the normalization brightness difference at $\theta$ of 45° and 0° is under 10%. Table 5 shows the symmetrical characteristic of the diffractive optical element 522, indicating that the azimuth angle of the diffraction grating 544 can be in a range between −90±60 degrees, preferably in a range between −90±20 degrees. In detail, for example, from the results in table 6A, it is found that the difference value between the normalization brightness values of 112 gray level at $\theta=45$ degrees and $\theta=0$ degree becomes bigger as the azimuth angle of the diffraction grating 544 of the diffractive optical element 522 is more diverged from −90 degrees. As the divergence is about −30 degrees, the difference value has the biggest value (10.97%), still smaller than the difference value (15.66%) of comparative example. Comparing the results in table 2A and table 6A founds that the effect of rotating the diffractive optical element 522 is weaker than that of rotating the diffractive optical element 212.

The test results also show that at observation angle $\psi=0$ degree, the greatest difference value (26.33%) between the normalization brightness at the zenith angle $\theta=60$ degrees and the normalization brightness at the zenith angle $\theta=0$ degree of comparative example is at the 104 gray level. Therefore, this test takes 104 gray level a an observation standard for the condition of $(\theta,\psi)=(60,0)$. The difference value between the normalization brightness of the display device with the diffractive optical element 522 in embodiments is smaller than that in comparative examples. In embodiments, the azimuth angle of the diffraction grating 544 may be in a range of −90~−30 degrees in which the normalization brightness values are all improved, or in a range of −90~−40 degrees in which in which a variation degree of the optimum values of the normalization brightness difference at $\theta$ of 60° and 0° is under 10%. In detail, for example, from the results in table 6A, it is found that the difference value between the normalization brightness values of 104 gray level at $\theta=45$, 60 degrees and $\theta=0$ degree becomes bigger as the azimuth angle of the diffraction grating 544 of the diffractive optical element 522 is more diverged from −50 degrees. As the divergence is about −50 degrees, the difference value has the smallest value (12.75%). As the divergence is about −30 degrees, the difference value has the biggest value (15.33%), still smaller than the difference value (26.33%) of comparative example.

TABLE 6A

| | ($\psi$ = 0 degree) | | | |
|---|---|---|---|---|
| azimuth angle of diffraction grating 544 | Normalization brightness difference between $\theta$ of 45° and 0° (gray level 112) | normalization difference at $\theta$ of 45° | Normalization brightness difference between $\theta$ of 60° and 0° (gray level 104) | normalization difference at $\theta$ of 60° |
| comparative example | 15.66% | — | 26.33% | — |
| −90 | 8.98% | 100.00% | 13.28% | 100.00% |
| −80 | 9.68% | 107.74% | 14.07% | 105.94% |
| −70 | 9.52% | 105.95% | 12.85% | 96.77% |
| −60 | 9.99% | 111.21% | 13.43% | 101.10% |
| −50 | 10.04% | 111.78% | 12.75% | 95.98% |
| −40 | 10.76% | 119.79% | 14.19% | 106.83% |
| −30 | 10.97% | 122.12% | 15.33% | 115.40% |

At the observation angle $\psi=45$ degrees, the greatest difference value (15.27%) between the normalization brightness at the zenith angle $\theta=45$ degrees and the normalization brightness at the zenith angle $\theta=0$ degree of comparative example is at the 128 gray level. Therefore, this test takes 128 gray level as an observation standard for the condition of $(\theta,\psi)=(45,45)$. The difference value between the normalization brightness values of the display device with the diffractive optical element 522 in embodiments is smaller than that in comparative examples. In embodiments, the azimuth angle of the diffraction grating 544 may be in a range of −90~−30 degrees, preferably in a range of −70~−30 degrees. In detail, for example, from the results in table 6B, it is found that the difference value between the normalization brightness values of 128 gray level at $\theta=45$ degrees and $\theta=0$ degree becomes bigger as the azimuth angle of the diffraction grating 544 of the diffractive optical element 522 is more diverged from −50 degrees. As the divergence is about −80 degrees, the difference value has the biggest value (9.25%), still smaller than the difference value of comparative example (15.27%).

The test results also show that at observation angle $\psi=45$ degrees, the greatest difference value (25.50%) between the normalization brightness at the zenith angle $\theta=60$ degrees and the normalization brightness at the zenith angle $\theta=0$ degree of comparative example is at the 136 gray level.

Therefore, this test takes 136 gray level as an observation standard for the condition of $(\theta,\psi)=(60,45)$. The difference value between the normalization brightness values of the display device with the diffractive optical element 522 in embodiments is smaller than that in comparative examples. In embodiments, the azimuth angle of the diffraction grating 544 may be in a range of −90~−30 degrees. In detail, for example, from the results in table 6B, it is found that the difference value between the normalization brightness values of 136 gray level at θ=60 degrees and θ=0 degree becomes bigger as the azimuth angle of the diffraction grating 544 of the diffractive optical element 522 is more diverged from −70 degrees. As the divergence is about −40 degrees, the difference value has the biggest value (11.98%), still smaller than the difference value of comparative example (25.50%).

TABLE 6B (ψ = 45 degrees)

| azimuth angle of diffraction grating 544 | Normalization brightness difference between θ of 45° and 0° (gray level 128) | normalization difference at θ of 45° | Normalization brightness difference between θ of 60° and 0° (gray level 136) | normalization difference at θ of 60° |
|---|---|---|---|---|
| comparative example | 15.27% | — | 25.5% | — |
| −90 | 9.13% | 100.00% | 11.57% | 100.00% |
| −80 | 9.25% | 101.26% | 11.75% | 101.55% |
| −70 | 8.38% | 91.75% | 11.00% | 95.08% |
| −60 | 8.15% | 89.18% | 11.49% | 99.35% |
| −50 | 7.63% | 83.56% | 11.31% | 97.76% |
| −40 | 7.87% | 86.14% | 11.98% | 103.56% |
| −30 | 8.24% | 90.18% | 11.94% | 103.25% |

<Fourth Experimental Example>

Figure 41:
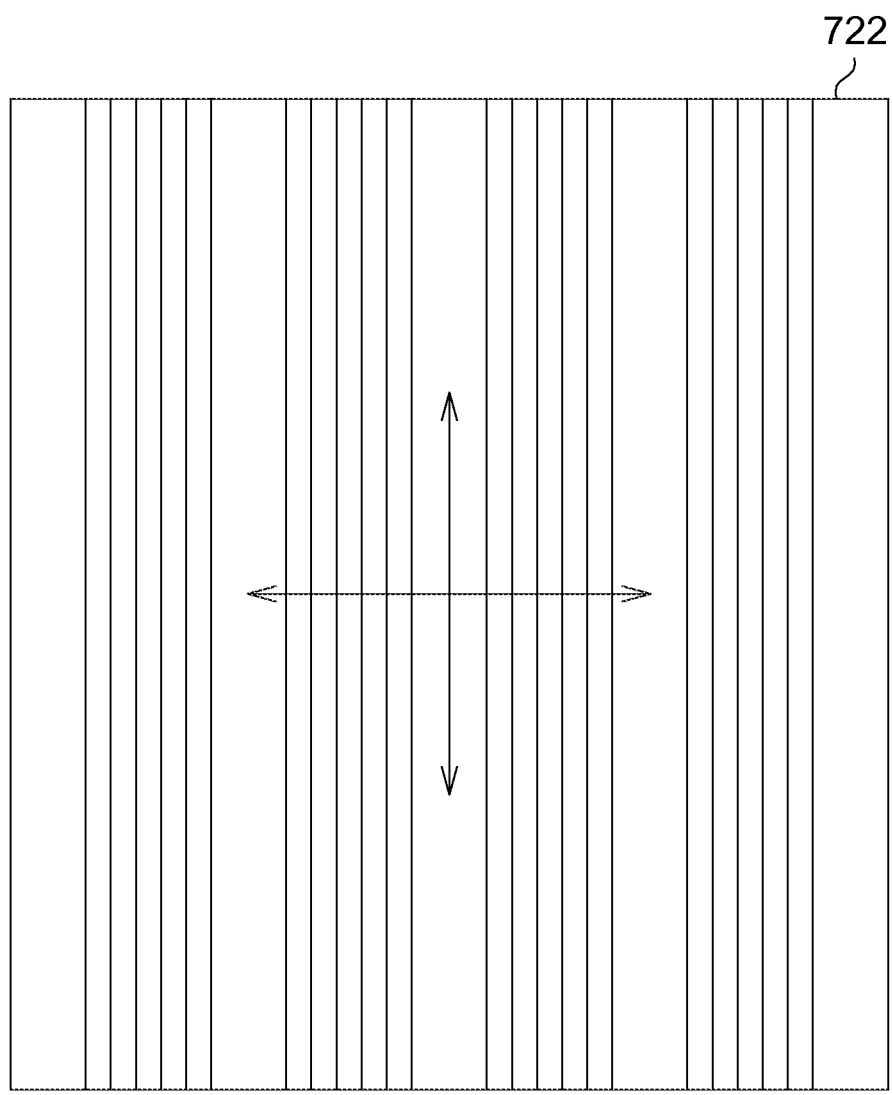
Figure 42:
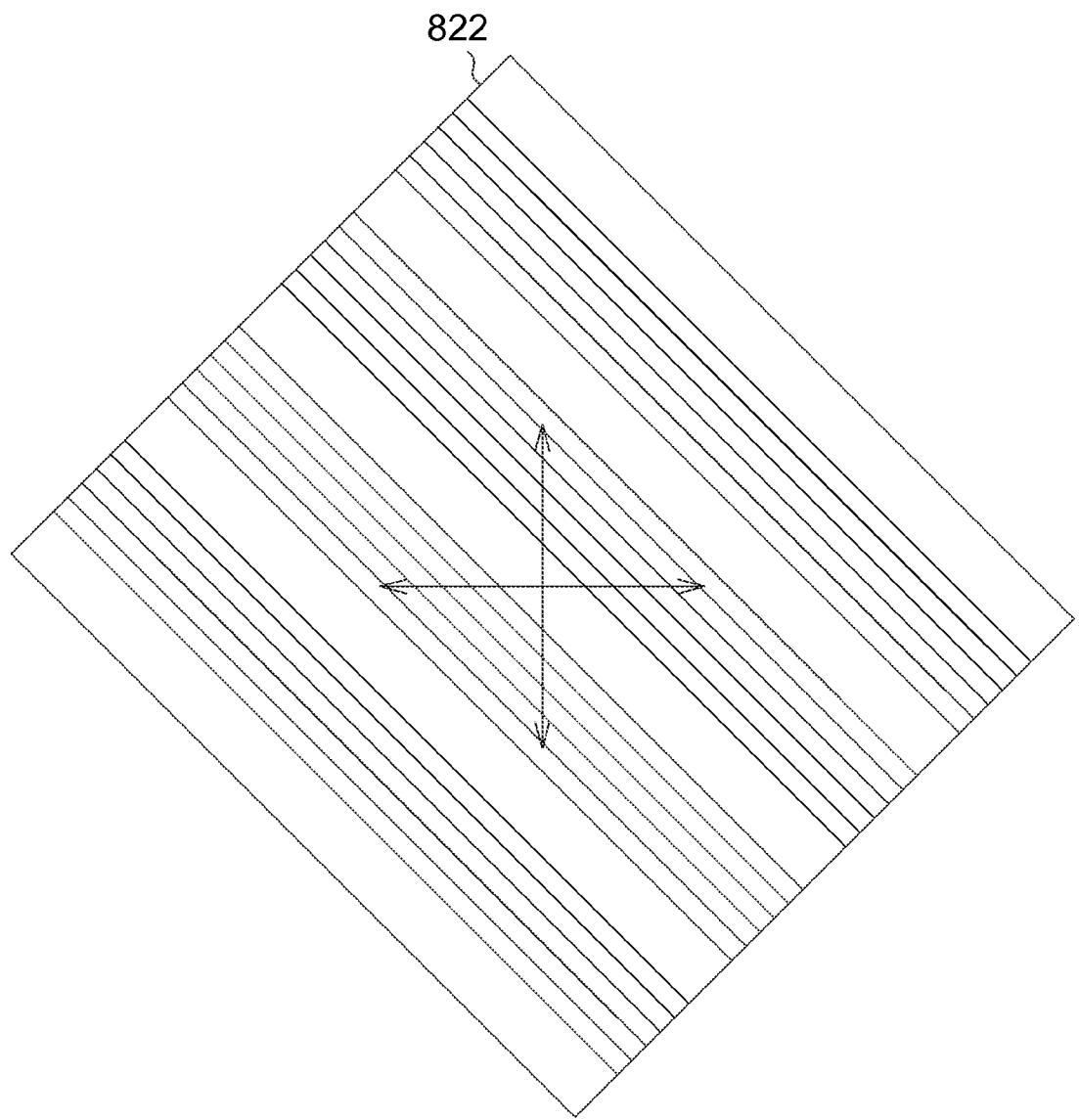
Figure 43:
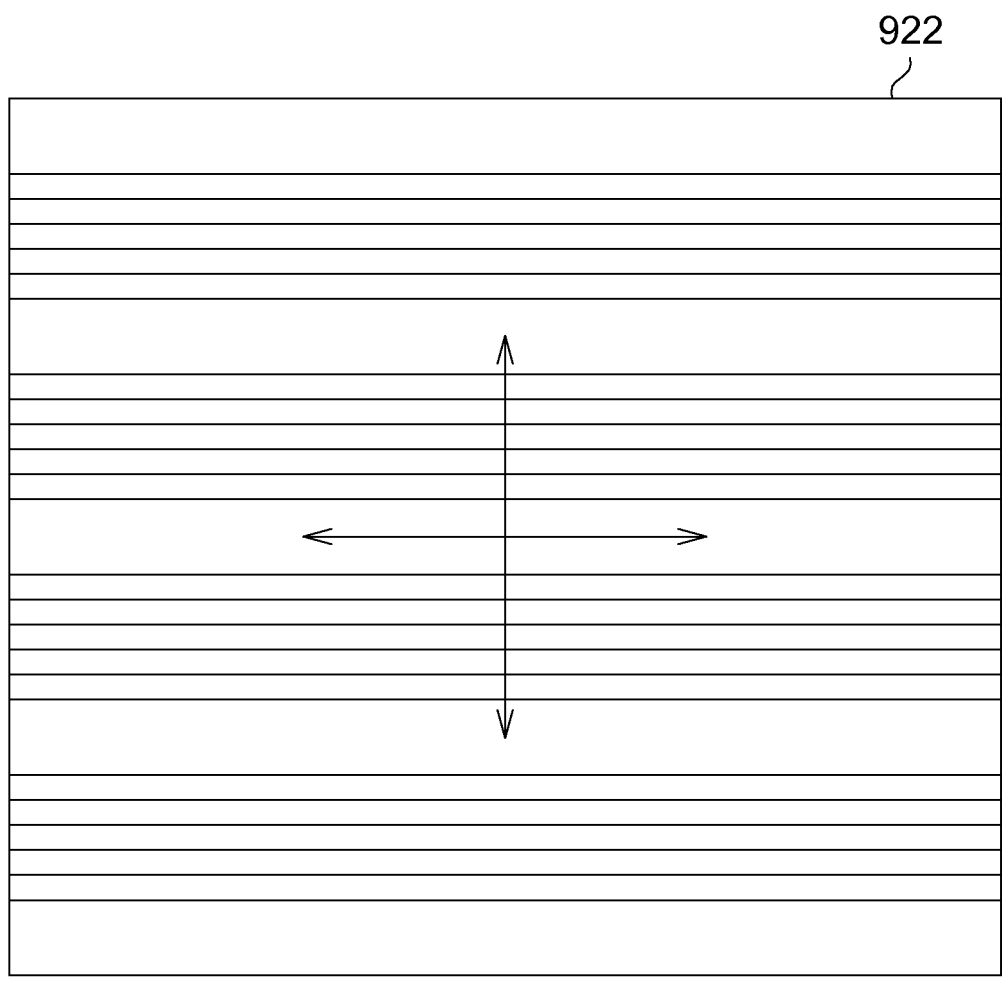

The experiment uses the Konica Minolta CS-2000 to measure the V260B3-LE1 multi-domain vertical aligned type liquid crystal display device (the pixel of which is 1366*768,60 PPI, the long side of the pixel is 421 μm) incorporated with the diffractive optical element having the diffraction grating of the single azimuth angle being the diffractive optical element 722 in FIG. 41 (similar to the diffractive optical element 212 in FIG. 17), the diffractive optical element 822 in FIG. 42 and the diffractive optical element 922 in FIG. 43 respectively. The diffractive optical element 722 in FIG. 41 is obtained by setting the diffractive optical element 212 of the first embodiment into the azimuth angle of the diffraction grating of the grating region at −90 degrees. The diffractive optical element 822 in FIG. 42 is obtained by setting the diffractive optical element 212 of the first embodiment into the azimuth angle of the diffraction grating of the grating region at −45 degrees. The diffractive optical element 922 in FIG. 43 is obtained by setting the diffractive optical element 212 of the first embodiment into the azimuth angle of the diffraction grating of the grating region at 0 degree. In addition, the azimuth angle of the polarizing direction of the polarizer (the upper polarizer) on the light emitting side of the liquid crystal display device is set at 90 degrees, that is, the direction of the absorbing axis is set at 0 degree. Moreover, the azimuth angle of the polarizing direction of the polarizer (the lower polarizer) adjacent to the backlight module is set at 0 degree, that is, the direction of the absorbing axis is set at 90 degrees.

FIG. 44 shows curves of the brightness in the white state and the contrast of the display device with the fixed azimuth angle ψ (FIG. 1) of 0 degree and various zenith angles θ. FIG. 45 shows curves of the brightness in the black state of the display device with the fixed azimuth angle ψ of 0 degree and various zenith angles θ. FIG. 46 shows curves of the brightness in the white state and the contrast of the display device with the fixed azimuth angle ψ of 90 degrees and various zenith angles θ. FIG. 47 shows curves of the brightness in the black state of the display device with the fixed azimuth angle ψ of 90 degrees and various zenith angles θ. From the results shown in FIGS. 44-47, it is found that the contrast difference is mainly due to the variation of the brightness in the black state since the variation of the brightness in the white state due to the variation of the measuring angle is gentle. FIG. 45 shows that in the observation result at the front view (θ=0° in the horizontal direction, i.e. at the azimuth angle ψ=0 degree, the display device exhibits a preferable black state, i.e. a lower brightness in the black state, as the azimuth angle of the diffraction grating is set at 0 degree, −90 degrees. In the observation result at the horizontal side view (ψ=0°), the display device exhibits a preferable black state as the azimuth angle of the diffraction grating is set at −90 degrees. FIG. 47 shows that in the observation result at the front view (θ=0°) in the vertical direction, i.e. at the azimuth angle ψ=90 degrees, the display device exhibits a preferable black state as the azimuth angle of the diffraction grating is set at 0 degree, −90 degrees. In the observation result at the vertical side view (ψ=90°), the display device exhibits a preferable black state as the azimuth angle of the diffraction grating is set at 0 degree.

FIG. 48 shows curves of the brightness in the black state and the central contrast of the display device having the diffractive optical element having the diffraction grating of the single azimuth angle at front view of various azimuth angles ψ. From FIG. 48, it is found that the big central contrast occurs in the condition that the azimuth angle of the diffraction grating is set at 90-15 (i.e. subtracting 15 from 90) degrees~90+15 (i.e. 90 plus 15) degrees, or 0-15 degrees~0+15 degrees. The biggest the central contrast occurs in the condition that the azimuth angle of the diffraction grating is set at 90 degrees, or 0 degree.

<Fifth Experimental Example>

Figure 49:
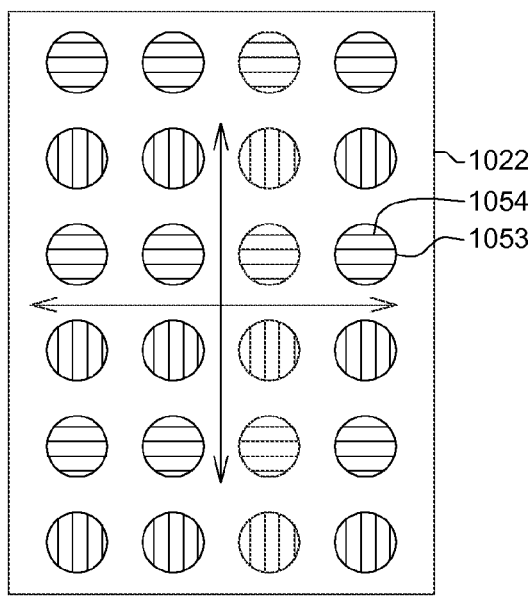
Figure 50:
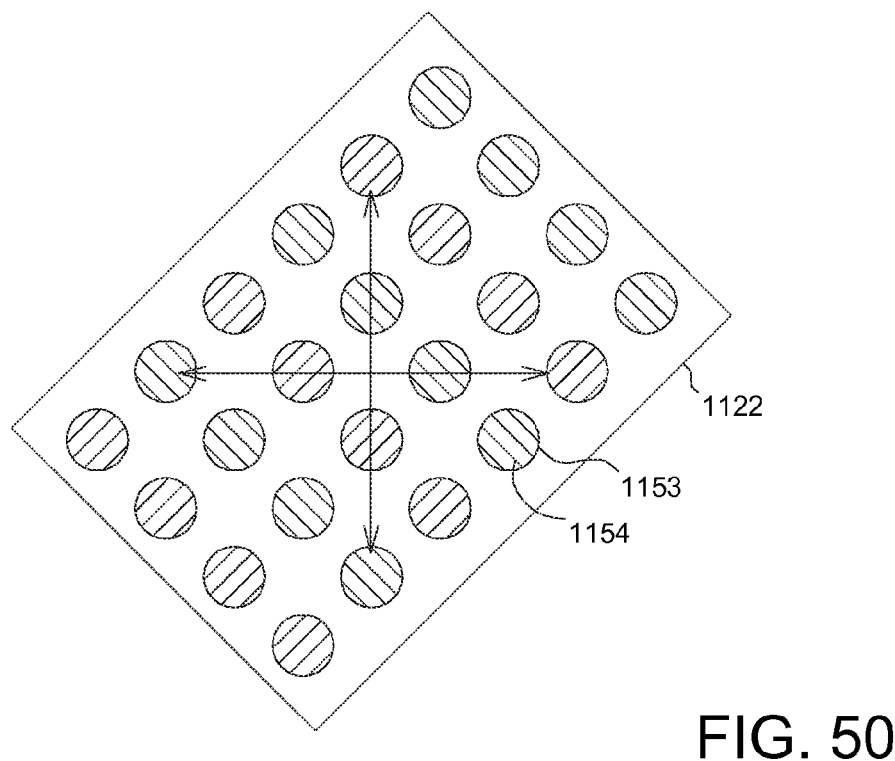
Figure 51:
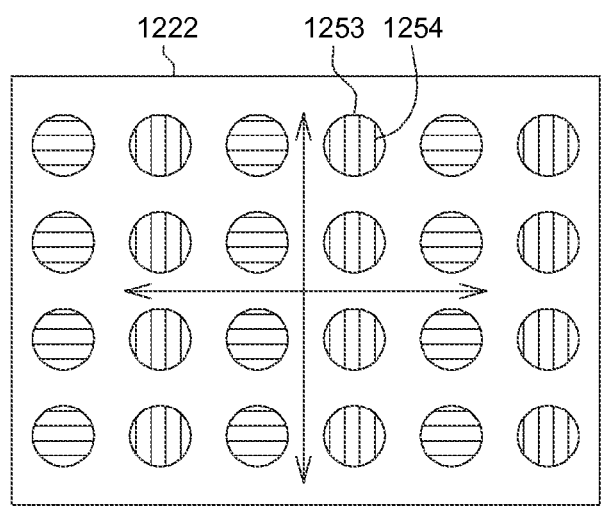

The experiment uses the Konica Minolta CS-2000 to measure the V260B3-LE1 multi-domain vertical aligned type liquid crystal display device (the pixel of which is 1366*768,60 PPI, the long side of the pixel is 421 μm) incorporated with the diffractive optical element having the diffraction grating of two kinds of the azimuth angles being the diffractive optical element 1022 in FIG. 49 (similar to the diffractive optical element 32 in FIG. 2), the diffractive optical element 1122 in FIG. 50 and the diffractive optical element 1222 in FIG. 51 respectively. The diffractive optical element 1022 in FIG. 49 is obtained by setting the diffractive optical element 462 of the second embodiment into the azimuth angle of the diffraction grating 1054 of the grating region 1053 at 0 degree as the standard. The diffractive optical element 1122 in FIG. 50 is obtained by setting the diffractive optical element 462 of the second embodiment into the azimuth angle of the diffraction grating 1154 of the grating region 1153 at −45 degrees as the standard. The diffractive optical element 1222 in FIG. 51 is obtained by setting the diffractive optical element 462 of the second embodiment into the azimuth angle of the diffraction grating 1254 of the grating region 1253 at −90 degrees as the standard. In addition, the azimuth angle of the polarizing direction of the polarizer (the upper polarizer) on the light emitting side of the liquid crystal display device is set at 90 degrees, that is, the direction of the absorbing axis is set at 0 degree. Moreover, the azimuth angle of the polarizing direction of the polarizer (the lower polarizer) adjacent to the backlight module is set at 0 degree, that is, the direction of the absorbing axis is set at 90 degrees.

FIG. 52 shows curves of the brightness in the white state and the contrast of the display device with the fixed azimuth angle ψ (FIG. 1) of 0 degree and various zenith angles θ. FIG. 53 shows curves of the brightness in the black state of the display device with the fixed azimuth angle ψ of 0 degree and various zenith angles θ. FIG. 54 shows curves of the brightness in the white state and the contrast of the display device with the fixed azimuth angle ψ of 90 degrees and various zenith angles θ. FIG. 55 shows curves of the brightness in the black state of the display device with the fixed azimuth angle ψ of 90 degrees and various zenith angles θ. From the results shown in FIGS. 52-55, it is found that the contrast difference is mainly due to the variation of the brightness in the black state. FIGS. 53 and 55 show that in the observation result at the front view (θ=0°), the display device exhibits a preferable black state as the azimuth angle of the diffraction grating is set at 0 degree, −90 degrees. FIG. 53 shows that in the observation result at the horizontal side view (ψ=0 degree), the display device exhibits a preferable black state as the azimuth angle of the diffraction grating is set at 0 degree, −90 degrees, and at the small zenith angle θ (−25~25 degrees). FIG. 55 shows that in the observation result at the vertical side view (ψ=90°), the display device exhibits a preferable black state as the azimuth angle of the diffraction grating is set at 0 degree, −90 degrees, and at the small zenith angle θ (−25~25 degrees).

FIG. 56 shows curves of the brightness in the black state and the central contrast of the display device having the diffractive optical element having the diffraction grating of two kinds of the azimuth angles at front view of various azimuth angles ψ. From FIG. 56, it is found that the big central contrast occurs in the condition that the azimuth angle of the diffraction grating is set at 90-15 (i.e. subtracting 15 from 90) degrees~90+15 (i.e. 90 plus 15) degrees, or −15 degrees~+15 degrees. The biggest the central contrast occurs in the condition that the azimuth angle of the diffraction grating is set at 90 degrees, or 0 degree.

<Sixth Experimental Example>

Figure 57:
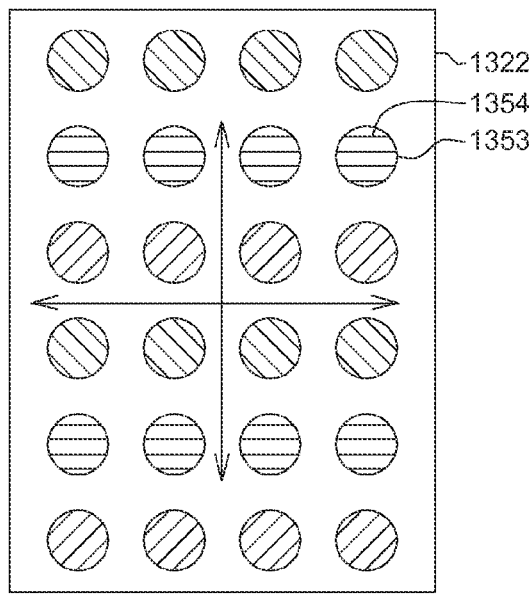
Figure 58:
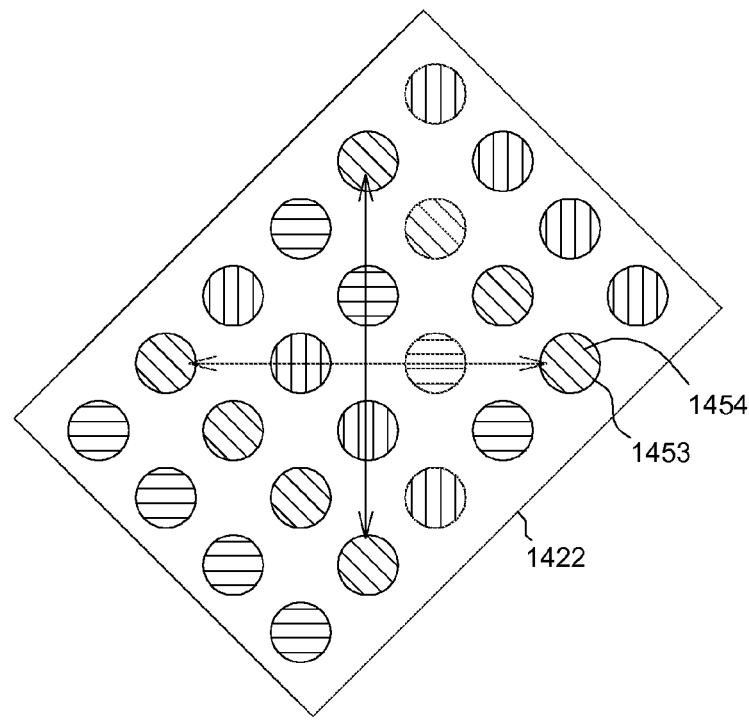
Figure 59:
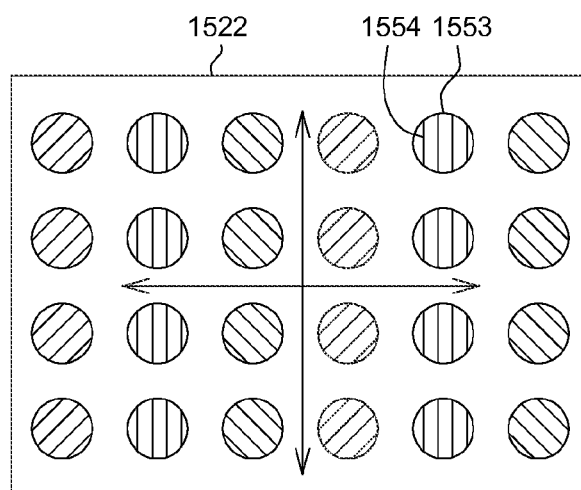

The experiment uses the Konica Minolta CS-2000 to measure the V260B3-LE1 multi-domain vertical aligned type liquid crystal display device (the pixel of which is 1366*768,60 PPI, the long side of the pixel is 421 μm) incorporated with the diffractive optical element having the diffraction grating of three kinds of the azimuth angles being the diffractive optical element 1322 in FIG. 57 (similar to the diffractive optical element 82 in FIG. 4), the diffractive optical element 1422 in FIG. 58 and the diffractive optical element 1522 in FIG. 59 respectively. The diffractive optical element 1322 in FIG. 57 is obtained by setting the diffractive optical element 522 of the third embodiment into the azimuth angle of the diffraction grating 1354 of the grating region 1353 at 0 degree as the standard. The diffractive optical element 1422 in FIG. 58 is obtained by setting the diffractive optical element 522 of the third embodiment into the azimuth angle of the diffraction grating 1454 of the grating region 1453 at −45 degrees as the standard. The diffractive optical element 1522 in FIG. 59 is obtained by setting the diffractive optical element 522 of the third embodiment into the azimuth angle of the diffraction grating 1554 of the grating region 1553 at −90 degrees as the standard. In addition, the azimuth angle of the polarizing direction of the polarizer (the upper polarizer) on the light emitting side of the liquid crystal display device is set at 90 degrees, that is, the direction of the absorbing axis is set at 0 degree. Moreover, the azimuth angle of the polarizing direction of the polarizer (the lower polarizer) adjacent to the backlight module is set at 0 degree, that is, the direction of the absorbing axis is set at 90 degrees.

FIG. 60 shows curves of the brightness in the white state and the contrast of the display device with the fixed azimuth angle ψ (FIG. 1) of 0 degree and various zenith angles θ. FIG. 61 shows curves of the brightness in the black state of the display device with the fixed azimuth angle ψ of 0 degree and various zenith angles θ. FIG. 62 shows curves of the brightness in the white state and the contrast of the display device with the fixed azimuth angle ψ of 90 degrees and various zenith angles θ. FIG. 63 shows curves of the brightness in the black state of the display device with the fixed azimuth angle ψ of 90 degrees and various zenith angles θ. From the results shown in FIGS. 60-63, it is found that the contrast difference is mainly due to the variation of the brightness in the black state. FIGS. 61 and 63 show that in the observation result at the front view (θ=0°), the display device exhibits a preferable black state as the azimuth angle of the diffraction grating is set at −45 degrees. FIG. 61 shows that in the observation result at the horizontal side view (ψ=0 degree), the display device exhibits a preferable black state as the azimuth angle of the diffraction grating is set at −90 degrees, and at the medium zenith angle θ (about 25~60 degrees, −25~−60 degrees). FIG. 63 shows that in the observation result at the vertical side view (ψ=90°), the display device exhibits a preferable black state as the azimuth angle of the diffraction grating is set at 0 degree, and at the medium zenith angle θ (about 25~60 degrees, −25~−60 degrees).

FIG. 64 shows curves of the brightness in the black state and the central contrast of the display device having the diffractive optical element having the diffraction grating of three kinds of the azimuth angles at front view of various azimuth angles ψ. From FIG. 64, it is found that the big central contrast occurs in the condition that the azimuth angle of the diffraction grating is set at −40-15 (i.e. subtracting 15 from −40) degrees~−40+15 (i.e. −40 plus 15) degrees, or 50-15 degrees~50+15 degrees. The biggest the central contrast occurs in the condition that the azimuth angle of the diffraction grating is set at −40 degrees, or 50 degrees.

In conclusion, from the fourth experimental example, the fifth experimental example, the sixth experimental example, it is found that in the observation result at the horizontal side view (ψ=0 degree), the display device exhibits a preferable black state as the azimuth angle of the diffraction grating is set at 90 degrees. In the observation result at the vertical side view (ψ=90°), the display device exhibits a preferable black state as the azimuth angle of the diffraction grating is set at 0 degree.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display apparatus, comprising:
 a liquid crystal display device, comprising:
 a backlight module; and
 a liquid crystal panel comprising a first substrate, a second substrate and a liquid crystal layer, wherein the liquid crystal layer is disposed between the first substrate and the second substrate and includes liquid crystal molecules,
 as no electrical field is applied in the liquid crystal layer, liquid crystal molecules are substantially perpendicular to surfaces of the first substrate and the second substrate, or the molecules have a pretilt angle substantially equal to or bigger than 60 degrees with the surfaces of the first substrate and the second substrate, as an electrical field is applied in the liquid crystal layer, the liquid crystal molecules are tilted into a liquid crystal tilt direction by the electrical field;

a first polarizer disposed above the first substrate, wherein the first substrate is a color filter substrate;

a second polarizer disposed between the second substrate and the backlight module, wherein a polarizing direction of the first polarizer is substantially perpendicular to a polarizing direction of the second polarizer; and a diffractive optical element including a first grating region having a first diffraction grating and a second grating region having a second diffraction grating and disposed on a light emitting side of the first polarizer, wherein an azimuth angle of the first diffraction grating is counted from an absorbing axis of the first polarizer as standard, wherein a period of the first grating region is 20 μm to 250 μm and a period of the second grating region is 20 μm to 250 μm;

wherein the first grating region is separated from the second grating region by a non-grating region, and the non-grating region is designed for generating an intensity ratio of the total zero order diffraction light to the total non-zero order diffraction light higher than 100:1.

2. The display apparatus according to claim 1, wherein the azimuth angle of the first diffraction grating is different from an azimuth angle of the second diffraction grating.

3. The display apparatus according to claim 2, wherein the azimuth angle of the first diffraction grating is different from the azimuth angle of the second diffraction grating by 90 degrees.

4. The display apparatus according to claim 2, wherein the diffractive optical element further comprises a third diffraction grating, an azimuth angle of the third diffraction grating is different from the azimuth angle of the first diffraction grating and the azimuth angle of the second diffraction grating.

5. The display apparatus according to claim 4, wherein the azimuth angle of the first diffraction grating is different from the azimuth angle of the second diffraction grating by 45 degrees, the azimuth angle of the first diffraction grating is different from the azimuth angle of the third diffraction grating by 135 degrees.

6. The display apparatus according to claim 1, wherein the azimuth angle of the first diffraction grating is in a range between 0±15 degrees or a range between 90±10 degrees.

7. The display apparatus according to claim 1, wherein the azimuth angle of the first diffraction grating is in a range between −90±60 degrees.

8. The display apparatus according to claim 7, wherein the azimuth angle of the first diffraction grating is in a range between −90±20 degrees.

9. The display apparatus according to claim 1, wherein the azimuth angle of the first diffraction grating is in a range of −90 degrees to −30 degrees.

10. The display apparatus according to claim 9, wherein the azimuth angle of the first diffraction grating is in a range of −80 degrees to −40 degrees.

11. The display apparatus according to claim 9, wherein the azimuth angle of the first diffraction grating is in a range of −60 degrees to −40 degrees or in a range of 60 degrees to 40 degrees.

12. The display apparatus according to claim 3, wherein the azimuth angle of the first diffraction grating is in a range between 0±15 degrees or in a range between 90±10 degrees.

13. The display apparatus according to claim 3, wherein the azimuth angle of the first diffraction grating is in a range of 0 degree to 105 degrees.

14. The display apparatus according to claim 3, wherein the azimuth angle of the first diffraction grating is in a range of 0~60 degrees.

15. The display apparatus according to claim 3, wherein the azimuth angle of the first diffraction grating is in a range of 20~60 degrees.

16. The display apparatus according to claim 5, wherein the azimuth angle of the first diffraction grating is in a range between 45±90 degrees or in a range between −45±90 degrees.

17. The display apparatus according to claim 5, wherein the azimuth angle of the first diffraction grating is in a range between −90±60 degrees.

18. The display apparatus according to claim 17, wherein the azimuth angle of the first diffraction grating is in a range between −90±20 degrees.

19. The display apparatus according to claim 5, wherein the azimuth angle of the first diffraction grating is in a range of −90 degrees to −30 degrees.

20. The display apparatus according to claim 19, wherein the azimuth angle of the first diffraction grating is in a range of −70 degrees to −30 degrees.

21. A display apparatus, comprising:
a liquid crystal display device, comprising:
a backlight module; and
a liquid crystal panel comprising a first substrate, a second substrate and a liquid crystal layer, wherein the liquid crystal layer is disposed between the first substrate and the second substrate and includes liquid crystal molecules, as no electrical field is applied in the liquid crystal layer, liquid crystal molecules are substantially perpendicular to surfaces of the first substrate and the second substrate, or the molecules have a pretilt angle substantially equal to or bigger than 60 degrees with the surfaces of the first substrate and the second substrate, as an electrical field is applied in the liquid crystal layer, the liquid crystal molecules are tilted into a liquid crystal tilt direction by the electrical field;

a first polarizer disposed on the first substrate;

a second polarizer disposed between the second substrate and the backlight module, wherein a polarizing direction of the first polarizer is substantially perpendicular to a polarizing direction of the second polarizer; and a diffractive optical element including a first grating region having a plurality of first diffraction gratings and a second grating region having a second diffraction grating and disposed on a light emitting side of the first polarizer, wherein an azimuth angle of each of the first diffraction gratings is counted from an absorbing axis of the first polarizer as standard;

wherein the first grating region is separated from the second grating region by a non-grating region;

wherein the plurality of first diffraction gratings of the first grating region have the same azimuth angle and various periods; and wherein the non-grating region is designed for generating an intensity ratio of the total zero order diffraction light to the total non-zero order diffraction light higher than 100:1, and a period of the first grating region is 20 µm to 250 µm and a period of the second grating region is 20 µm to 250 µm.

22. A polarizer for a multi-domain vertical aligned liquid crystal display apparatus, comprising:
a first polarizer having a light absorbing axis; and
a diffractive optical element including a first grating region having a first diffraction grating and a second grating region having a second diffraction grating and disposed on a side of the first polarizer, wherein an included angle between a grating direction of the first diffraction grating and the light absorbing axis is in a range between 0±15 degrees or in a range between 90±10 degrees, and the first grating region is separated from the second grating region by a non-grating region;
wherein the non-grating region is designed for generating an intensity ratio of the total zero order diffraction light to the total non-zero order diffraction light higher than 100:1, and a period of the first grating region is 20 µm to 250 µm and a period of the second grating region is 20 µm to 250 µm.

23. The polarizer according to claim 22, wherein the diffractive optical element further includes the second diffraction grating, the grating direction of the first diffraction grating is different from a grating direction of the second diffraction grating, and an included angle between the grating direction of the first diffraction grating and the grating direction of the second diffraction grating is substantially 90 degrees.

24. The polarizer according to claim 22, wherein the diffractive optical element further includes a third diffraction grating, a grating direction of the third diffraction grating is different from the grating direction of the first diffraction grating and the grating direction of the second diffraction grating.

25. The polarizer according to claim 24, wherein an included angle between the grating direction of the first diffraction grating and the grating direction of the second diffraction grating is substantially 45 degrees, an included angle between the grating direction of the first diffraction grating and the grating direction of the third diffraction grating is substantially 135 degrees.

* * * * *